United States Patent
Takano

(10) Patent No.: US 9,622,282 B2
(45) Date of Patent: Apr. 11, 2017

(54) COMMUNICATION CONTROL DEVICE, COMMUNICATION CONTROL METHOD, AND TERMINAL DEVICE

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/055,083

(22) Filed: Feb. 26, 2016

(65) Prior Publication Data

US 2016/0198513 A1 Jul. 7, 2016

Related U.S. Application Data

(63) Continuation of application No. PCT/JP2014/005152, filed on Oct. 9, 2014.

(30) Foreign Application Priority Data

Oct. 18, 2013 (JP) .................................. 2013-217188

(51) Int. Cl.
*H04W 76/02* (2009.01)
*H04W 48/12* (2009.01)
*H04W 48/16* (2009.01)
*H04W 72/04* (2009.01)

(52) U.S. Cl.
CPC ......... *H04W 76/025* (2013.01); *H04W 48/12* (2013.01); *H04W 48/16* (2013.01); *H04W 72/0453* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2011/0151887 A1 | 6/2011 | Hakola et al. | |
| 2011/0268101 A1 | 11/2011 | Wang et al. | |
| 2012/0213183 A1 | 8/2012 | Chen et al. | |
| 2012/0236776 A1* | 9/2012 | Zhang | H04W 48/12 370/312 |
| 2013/0223356 A1 | 8/2013 | Khoshnevis et al. | |
| 2013/0288608 A1* | 10/2013 | Fwu | H04W 72/02 455/63.1 |
| 2014/0185495 A1* | 7/2014 | Kuchibhotla | H04W 76/023 370/281 |
| 2014/0293988 A1* | 10/2014 | Han | H04L 5/0085 370/344 |

(Continued)

FOREIGN PATENT DOCUMENTS

| | | |
|---|---|---|
| GB | 2497579 | 6/2013 |
| WO | WO 2013/068788 | 5/2013 |

OTHER PUBLICATIONS

International Search Report mailed Jul. 4, 2015, for PCT/JP2014/005152, filed Oct. 9, 2014 (English).

(Continued)

*Primary Examiner* — Min Jung
(74) *Attorney, Agent, or Firm* — Oblon, McClelland, Maier & Neustadt, L.L.P.

(57) ABSTRACT

A communication control device includes circuitry that acquires system information indicating information to enable a device to communicate with another device via device-to-device communication, and that controls transmission of the system information to a terminal device.

14 Claims, 27 Drawing Sheets

(56) References Cited

U.S. PATENT DOCUMENTS

| | | | |
|---|---|---|---|
| 2014/0342747 A1* | 11/2014 | Lee | H04L 5/0053 455/450 |
| 2015/0045016 A1* | 2/2015 | Xiong | H04W 8/005 455/426.1 |
| 2015/0049674 A1* | 2/2015 | Kuo | H04W 48/16 370/328 |
| 2015/0078297 A1* | 3/2015 | Zheng | H04W 76/023 370/329 |
| 2016/0088458 A1* | 3/2016 | Chae | H04W 8/005 370/328 |
| 2016/0212793 A1* | 7/2016 | Jung | H04W 36/0016 |

OTHER PUBLICATIONS

Written Opinion mailed Jul. 4, 2015, for PCT/JP2014/005152, filed Oct. 9, 2014 (English).

Intel Corporation: "Resource allocation for D2D discovery", 3GPP Draft; R2-133512 Resource Allocation for D2D Discovery, 3rd Generation Partnership Project (3GPP), Mobile Competence Centre; 650, Route Des Lucioles; F-06921 Sophia-Antipolis Cedex; France, vol. RAN WG2, no. Ljubljana, Slovenia; 20131007-20131011, Sep. 28, 2013, XP050719226. Retrieved from the Internet: http://www.3gpp.org/ftp/tsg_ran/WG2_RL2/TSGR2_83bis/Docs/ [retrieved Sep. 28, 2013].

Qualcomm incorporated: "Aspects of D2D Discovery", 3GPP Draft; R2-132446, 3rd Generation Partnership Project (3GPP), Mobile Competence Centre; 650, route Des Lucioles; F-06921 Sophia-Antipolis Cedex; France, vol. RAN WG2, no. Barcelona, Spain; 20130819-20130823, Aug. 9, 2013, XP050718178. Retrieved from Internet: http://www.3gpp.org/ftp/tsg_ran/WG2_RL2/TSGR2_83/Docs/ [retrieved on Aug. 9, 2013].

NEC Group: "Discussion on resource allocation for D2D broadcast communication", 3GPP Draft; R1-134242_D2D_Broadcast_COMM, 3rd Generation Partnership Project (3GPP), Mobile Competence Centre; 650, Route Des Lucioles; F-06921 Sophia-Antipolis Cedex; France, vol. RAN WG1, no. Guangzhou, China; 20131007-20131011, Sep. 27, 2014. Retrieved from Internet: http://www.3gpp.org/ftp/tsg_ran/WG1_RL1/TSGR1_74b/Docs/ [retrieved on Sep. 27, 2013].

Huawei et al: "Resource assignment for D2D communication", 3GPP Draft; R1-134073, 3rd Generation Partnership Project (3GPP), Mobile Competence Centre; 650, Route Des Lucioles;F-06921 Sophia-Antipolis Cedex; France, vol. RAN WG1, no. Guangzhou, China; 20131007-20131011, Sep. 28, 2013. Retrieved from Internet: http://www.3gpp.org/ftp/tsg_ran/WG1_RL1/TSGR1_74b/Docs/ [retrieved Sep. 28, 2013].

3rd Generation Partnership Project; Technical Specification Group SA; Feasibility Study for Proximity Services (ProSe) (Release 12), 3GPP TR 22.803, vol. 2.0 (Feb. 2012).

3rd Generation Partnership Project; Technical Specification Group SA; Feasibility Study for Proximity Services (ProSe) (Release 12), 3GPP TR 22.803, vol. 2.0 (Jun. 2013).

\* cited by examiner

COMMUNICATION CONTROL DEVICE, COMMUNICATION CONTROL METHOD, AND TERMINAL DEVICE

CROSS REFERENCE TO RELATED APPLICATIONS

This is a continuation application of International Application No. PCT/JP2014/005152, filed on Oct. 9, 2014, which claims the benefit of Japanese Priority Patent Application JP 2013-217188 filed Oct. 18, 2013; the entire contents of which are incorporated herein by reference.

TECHNICAL FIELD

The present disclosure relates to a communication control device, a communication control method, and a terminal device.

BACKGROUND ART

Device-to-device communication (D2D communication) is communication in which two or more terminal devices transmit and receive signals directly, unlike typical cellular communication in which a base station and a terminal device transmit and receive signals. For this reason, it is anticipated that D2D communication will be used to create new usage scenarios for terminal devices that differ from the typical cellular communication above. For example, various applications are conceivable, such as information sharing by data communication between nearby terminal devices or among a group of nearby terminal devices, distribution of information from an installed terminal device, and autonomous communication between machines, called machine-to-machine (M2M) communication.

Additionally, it is conceivable that D2D communication will be put to effective use in data offloading in response to the significant increase in data traffic due to the recent increase in smartphones. For example, in recent years, there has been a sharp rise in the need to transmit and receive video image streaming data. However, since video images typically have large data sizes, there is a problem of consuming many resources on a radio access network (RAN). Consequently, if terminal devices are in a state suitable for D2D communication with each other, such as when the terminal devices are a short distance away from each other, video image data may be offloaded to D2D communication, thereby moderating the resource consumption and processing load on a RAN. In this way, D2D communication provides value to both telecommunications carriers and users. For this reason, D2D communication is currently recognized as one crucial technology area for Long Term Evolution (LTE), and is receiving attention from the 3rd Generation Partnership Project (3GPP) standards committee.

For example, Non Patent Literature 1 discloses use cases for D2D communication.

CITATION LIST

Non Patent Literature

[NPL 1]
3GPP TR 22.803, "3rd Generation Partnership Project; Technical Specification Group Services and System Aspects; Feasibility study for Proximity Services (ProSe)"

SUMMARY

Technical Problem

For example, a discovery signal that enables another device to discover a device conducting D2D communication is transmitted by the terminal device conducting D2D communication. However, if carrier aggregation is supported, the other terminal device conducting D2D communication may be unable to determine which component carrier the above discovery signal is transmitted on, and whether or not the discovery signal is receivable. For this reason, the other terminal device may, for example, conduct a detection process for detecting the discovery signal on the signals transmitted on all component carriers. As a result, the load on that other terminal device may increase.

Accordingly, it is desirable to provide a mechanism that enables a moderation of the load for a device conducting device-to-device communication (D2D communication).

Solution to Problem

According to an embodiment of the present disclosure, there is provided a communication control device including an acquisition unit that acquires carrier information indicating, from among a plurality of component carriers used for carrier aggregation, a component carrier for transmitting a discovery signal that enables another device to discover a device conducting device-to-device communication, and a control unit that controls transmission of the carrier information to a terminal device.

According to another embodiment of the present disclosure, there is provided a communication control method including acquiring carrier information indicating, from among a plurality of component carriers used for carrier aggregation, a component carrier for transmitting a discovery signal that enables another device to discover a device conducting device-to-device communication, and controlling, with a processor, transmission of the carrier information to a terminal device.

According to another embodiment of the present disclosure, there is provided a terminal device including an acquisition unit that acquires carrier information indicating, from among a plurality of component carriers used for carrier aggregation, a component carrier for transmitting a discovery signal that enables another device to discover a device conducting device-to-device communication, and a control unit that controls a detection process for detecting the discovery signal on the basis of the carrier information.

According to another embodiment of the present disclosure, there is provided a terminal device including an acquisition unit that acquires individual carrier information indicating, from among a plurality of component carriers used for carrier aggregation, a component carrier used by the terminal device to transmit a discovery signal that enables another device to discover a device conducting device-to-device communication, and a control unit that controls transmission of the individual carrier information to a base station.

According to another embodiment of the present disclosure, there is provided a terminal device including an acquisition unit that acquires carrier information indicating, from among a plurality of component carriers used for carrier aggregation, a component carrier for transmitting a discovery signal that enables another device to discover a device conducting device-to-device communication, and a control unit that controls transmission of the discovery signal on the basis of the carrier information.

According to another embodiment of the present disclosure, there is provided a terminal device including an acquisition unit that acquires information related to each of a plurality of component carriers used for carrier aggregation, and a control unit that controls transmission of a discovery signal that enables another device to discover a device conducting device-to-device communication in a manner that the discovery signal is transmitted on each of the plurality of component carriers.

According to another embodiment of the present disclosure, there is provided a terminal device including an acquisition unit that acquires information related to one component carrier from among a plurality of component carriers used for carrier aggregation, and a control unit that controls a detection process for detecting a discovery signal that enables another device to discover a device conducting device-to-device communication in a manner that the detection process is conducted on a signal transmitted on the one component carrier. The discovery signal is a signal transmitted on each of the plurality of component carriers.

According to another embodiment of the present disclosure, a communication control device includes circuitry that acquires system information indicating information to enable a device to communicate with another device via device-to-device communication, an that controls transmission of the system information to a terminal device.

In another embodiment of the present disclosure, a terminal device includes circuitry that acquires system information indicating information to enable a device to communicate with another device via device-to-device communication, and controls a detection process for detecting a discovery signal on the basis of the system information In a further embodiment of the present disclosure, a terminal device includes circuitry that acquires individual information to enable a terminal device to communicate with another device via device-to-device communication, and controls transmission of the individual information to a base station.

In still further embodiments of the present disclosure, a terminal device includes circuitry that acquires information indicating information to enable a device to communicate with another device via device-to-device communication, and controls transmission of a discovery signal on the basis of the information.

Advantageous Effects of Invention

According to an embodiment of the present disclosure as described above, it becomes possible to moderate the load for a device conducting device-to-device communication (D2D communication). Note that the above advantageous effects are not strictly limiting, and that any advantageous effect indicated in the present disclosure or another advantageous effect that may be reasoned from the present disclosure may also be exhibited in addition to, or instead of, the above advantageous effects.

DESCRIPTION OF EMBODIMENTS

Figure 1:
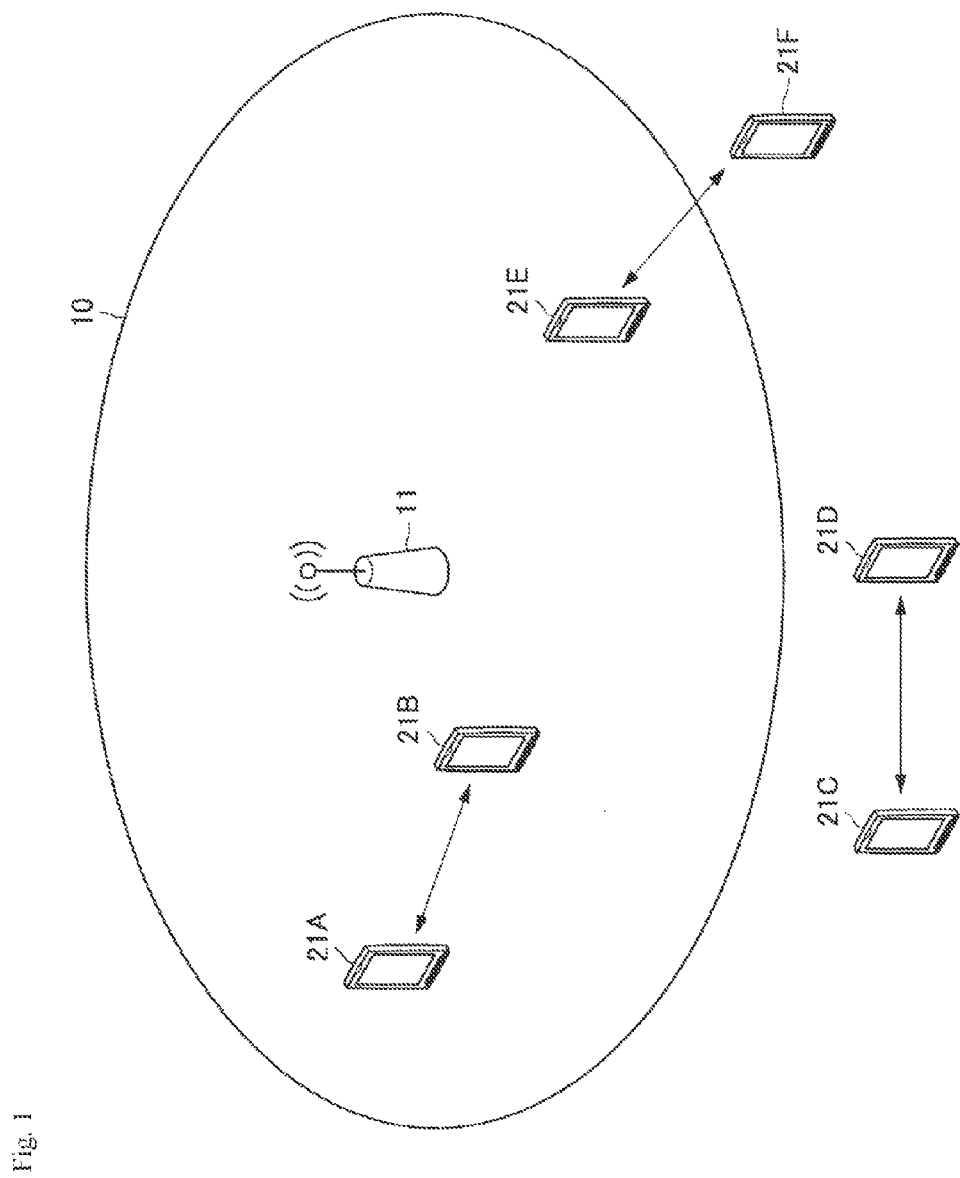
FIG. 1 is an explanatory diagram for illustrating an example of D2D communication.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as terminal devices 200A, 200B, 200C, and so on as appropriate. On the other hand, when not particularly distinguishing each of multiple elements having substantially the same function and structure, only the same sign will be given. For example, the terminal devices 200A, 200B, and 200C will be simply designated the terminal device 200 when not being particularly distinguished.

Hereinafter, the description will proceed in the following order.
1. Introduction
2. Schematic configuration of communication system
3. First Embodiment
3.1. Base station configuration
3.2. Terminal device configuration
3.3. Process flow
3.4. First modification
3.5. Second modification
4. Second Embodiment
4.1. Terminal device configuration
4.2. Process flow
5. Third Embodiment
5.1. Terminal device configuration
5.2. Process flow
6. Fourth Embodiment
6.1. Base station configuration
6.2. Terminal device configuration
6.3. Process flow
7. Applications
7.1. Applications related to base station
7.2. Applications related to terminal device
8. Conclusion
<<1. Introduction>>

First, technology and considerations related to D2D communication will be described with reference to FIG. 1.
(D2D Communication Use Cases)

Use cases for D2D communication have been argued in groups such as the Service and System Aspects (SA) 1 of the 3GPP, and are described in TR 22.803. Note that although TR 22.803 discloses use cases, specific configurations or methods of realizing such use cases are not disclosed.

Uses of D2D Communication

In an ordinary LTE system, a base station and a terminal device wirelessly communicate, but terminal devices do not wirelessly communicate with each other. However, there is demand for techniques enabling terminal devices to wirelessly communicate with each other directly for public safety uses or other general uses.

Public safety uses may include anti-collision warnings and disaster warnings, for example. Since most public safety uses are expected to relate to emergency situations, response time in D2D communication is considered to be important.

Meanwhile, other general uses include data offloading, for example. With data offloading by D2D communication, it becomes possible to reduce the load on a cellular communication network.

Coverage

D2D communication may be conducted inside the coverage of a base station, and may also be conducted outside the coverage of a base station. Alternatively, if one terminal device is positioned inside the coverage of a base station while another terminal device is positioned outside that coverage, D2D communication may be conducted by these terminal devices. Hereinafter, a specific example of a use case will be described with reference to FIG. 1.

FIG. 1 is an explanatory diagram for illustrating an example of D2D communication. Referring to FIG. 1, a base station 11 and multiple terminal devices 21 (that is, terminal devices 21A to 21F) are illustrated. As a first example of D2D communication, a terminal device 21A and a terminal device 21B positioned inside a cell 10 formed by the base station 11 (that is, the coverage of the base station 11) conduct D2D communication. Such D2D communication is called in-coverage D2D communication. As a second example of D2D communication, a terminal device 21C and a terminal device 21D positioned outside the cell 10 conduct D2D communication. Such D2D communication is called out-of-coverage D2D communication. As a third example of D2D communication, a terminal device 21E positioned inside the cell 10 and a terminal device 21F positioned outside the cell 10 conduct D2D communication. Such D2D communication is called partial-coverage D2D communication. From the perspective of public safety, out-of-coverage D2D communication and partial-coverage D2D communication are also important.

(Flow Up to D2D Communication: First Example)

As a first example, synchronization, discovery, and connection establishment are conducted in order, and after that, D2D communication is conducted.

Synchronization

When two terminal devices are positioned inside the coverage of a base station (that is, a cell formed by a base station), the two terminal devices are able to synchronize with other to a degree by acquiring synchronization with the base station using downlink signals from the base station.

On the other hand, if at least one of the two terminal devices attempting to conduct D2D communication is positioned outside the coverage of the base station (that is, a cell formed by a base station), at least one of the two terminal devices transmits a synchronization signal for synchronization in D2D communication, for example.

Discovery

Discovery is a process by which a terminal device identifies the presence of another terminal device nearby. In other words, discovery may also called a process by which a terminal device discovers another terminal device, or by which a terminal device is discovered by another terminal device.

Discovery is conducted by, for example, transmitting and receiving a discovery signal that enables another device to discover a device conducting D2D communication. More specifically, one of two terminal devices transmits a discovery signal, and the other of the two terminal devices receives that discovery signal, for example. The other terminal device then attempts to communicate with the terminal device.

Note that a discovery signal is appropriately detected by having the two terminal devices attempting to conduct D2D communication synchronize in advance before transmitting or receiving the discovery signal.

(Flow Up to D2D Communication: Another Example)

As a second example, synchronization, discovery, and identification of a meaning to be reported may also be conducted.

Specifically, possible techniques include a technique of giving meaning to the discovery signal itself, and a technique of transmitting meaning with another signal, for example. The former enables a terminal device that receives a discovery signal to immediately identify the meaning to be reported by detecting the discovery signal. With this technique, the resources for the discovery signal may increase, but the meaning is immediately transmitted, for example. On the other hand, the latter enables a device that receives a discovery signal to learn of the presence of another terminal device by detecting the discovery signal, and identify the meaning to be reported by receiving an additional signal. With this technique, transmitting meaning takes time, but the resources for the discovery signal itself may be decreased.

(Discovery-Related Load)

The discovery-related load on a terminal device includes the load of transmitting a discovery signal, and the load of a detection process for detecting a discovery signal. Herein, the term load may encompass factors such as load from the perspective of power consumption, and load from the perspective of processing complexity.

(Relationship Between D2D Communication and Carrier Aggregation)

It is readily conceivable that a terminal device supporting carrier aggregation may conduct D2D communication. In this case, which component carrier (CC) from among multiple component carriers to use to conduct D2D communication may become a topic of argument.

For example, if frequency-division duplex (FDD) is adopted, D2D communication is conducted on an uplink CC. Whether to conduct D2D communication on multiple uplink CCs may then become a topic of argument. With FDD, downlink CCs and uplink CCs correspond to each other, and ordinarily five downlink CCs and a corresponding five uplink CCs are used. With asymmetric carrier aggregation, for five downlink CCs, a smaller number of uplink CCs (for example, three uplink CCs) may be used. For this reason, multiple downlink CCs may correspond to one uplink CC. Even in such a case, it is conceivable for D2D communication to be conducted on an uplink CC.

If a terminal device uses multiple component carriers, the multiple component carriers include one primary component carrier (PCC) and one or more secondary component carriers (SCCs). On the PCC, information such as non-access stratum (NAS) signaling for establishing a connection is transmitted and received. The PCC may be changed by a handover. An SCC is used by being added to the PCC. For this reason, a terminal device does not use an SCC only. An SCC is added by activation, and removed by deactivation. Note that the PCC may differ depending on the terminal device.

(Frequency Bands Usable by Terminal Device)

The usable frequency bands may differ depending on the terminal device. For example, a first frequency band (2100 MHz band), a second frequency band (1900 MHz band), and a third frequency band (1800 MHz band) are available. In this case, a first terminal device is able to use the first frequency band and the second frequency band, for example. Meanwhile, a second terminal device is able to use the second frequency band and the third frequency band. Meanwhile, a third terminal device is able to use the third frequency band.

For example, if the usable frequency bands differ between terminal devices, the transmitting and receiving signals between those terminal devices may be difficult. For example, the first terminal device, although able to use the second frequency band to transmit a signal to the second terminal device, is unable to use either the first frequency band or the second frequency band to transmit a signal to the third terminal device. For example, the first terminal device and the third terminal device may be unable to conduct D2D communication for a public safety use.

<<2. Schematic Configuration of Communication System>>

Figure 2:
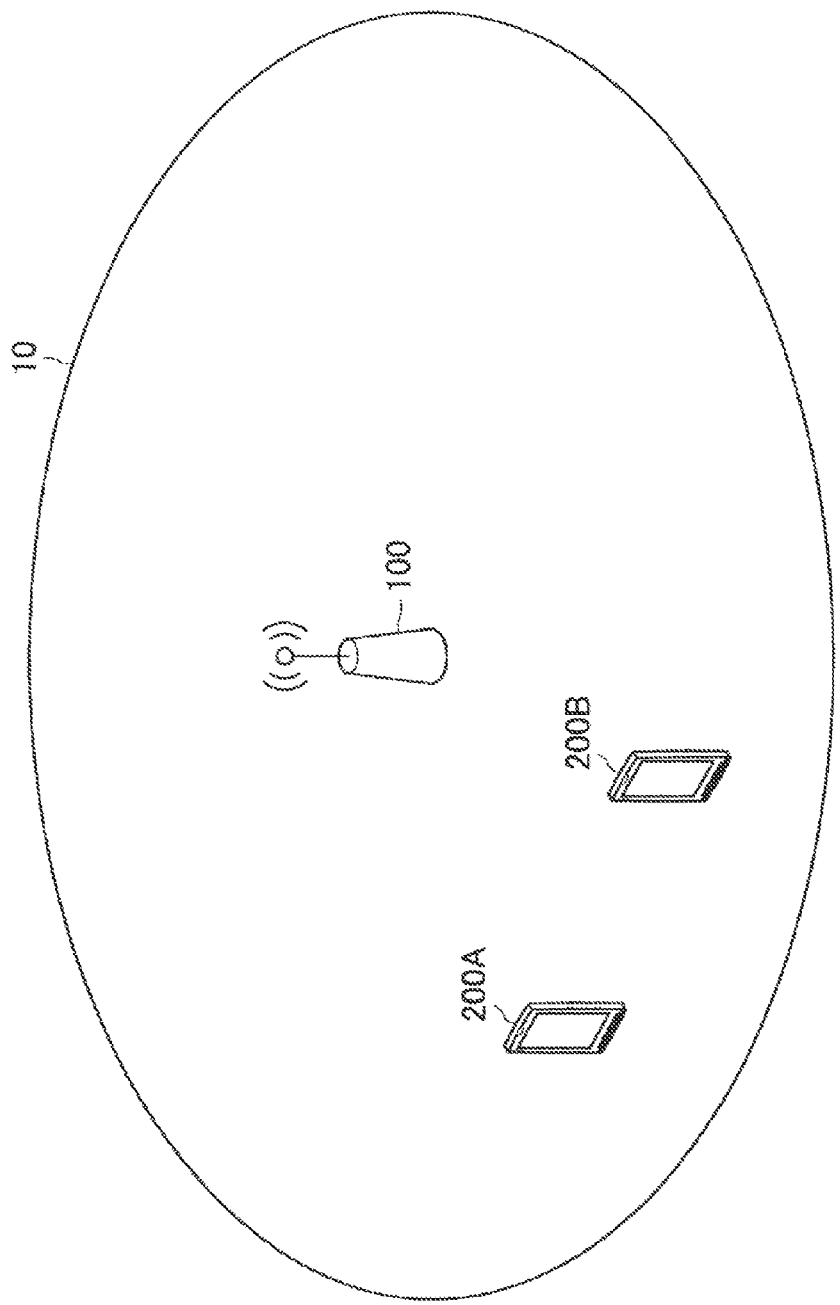
FIG. 2 is an explanatory diagram illustrating an example of a schematic configuration of a communication system according to an embodiment of the present disclosure.

Next, a schematic configuration of a communication system 1 according to an embodiment of the present disclosure will be described with reference to FIG. 2. FIG. 2 is an explanatory diagram illustrating an example of a schematic configuration of a communication system 1 according to an embodiment of the present disclosure. Referring to FIG. 2, the communication system 1 includes a base station 100 and multiple terminal devices 200 (that is, a terminal device 200A and a terminal device 200B). The communication system 1 is a system conforming to LTE, LTE-Advanced, or a compliant communication scheme, for example.

(Base Station 100)

The base station 100 wirelessly communicates with the terminal devices 200. For example, the base station 100 wirelessly communications with terminal devices 200 positioned inside a cell 10.

(Terminal Devices 200)

The terminal devices 200 wirelessly communicate with the base station 100. For example, the terminal devices 200 wirelessly communicate with the base station 100 when positioned inside the cell 10.

Particularly, in an embodiment of the present disclosure, a terminal device 200 conducts D2D communication with another terminal device 200. For example, if a terminal device 200 is positioned inside the cell 10 (that is, the coverage of the base station 100), the terminal device 200 conducts in-coverage D2D communication with another terminal device 200 positioned inside the cell 10. Furthermore, if a terminal device 200 is positioned inside the cell 10, the terminal device 200 may also conduct partial-coverage D2D communication with another terminal device 200 positioned outside the cell 10. Also, if a terminal device 200 is positioned outside the cell 10, the terminal device 200 may conduct out-of-coverage D2D communication with another terminal device 200 positioned outside the cell 10, or conduct partial-coverage D2D communication with another terminal device 200 positioned inside the cell 10.

Note that, for the frame format for D2D communication, the frame format for radio communication between the base station 100 and a terminal device 200 is used, for example. For example, radio frames and subframes are used as units of time in D2D communication. Furthermore, even in D2D communication, orthogonal frequency-division multiplexing (OFDM) is used, and resource blocks are used as units of radio resources, for example. Such a resource block is a radio resource extending over 12 subcarriers in the frequency direction, and over 7 OFDM symbols in the time direction.

<<3. First Embodiment>>

Next, a first embodiment of the present disclosure will be described with reference to FIGS. 3 to 10.

In the first embodiment, the base station 100 transmits to a terminal device information indicating a component carrier (CC) for transmitting a discovery signal, while a terminal device 200 conducts a detection process for detecting a discovery signal on the basis of that information. Consequently, it becomes possible to moderate the load on a terminal device 200 conducting D2D communication. Specifically, the load on the terminal device 200 for detecting a discovery signal is moderated, and in addition, the load on the terminal device 200 for transmitting a discovery signal is also moderated.

<3.1. Base Station Configuration>

Figure 3:
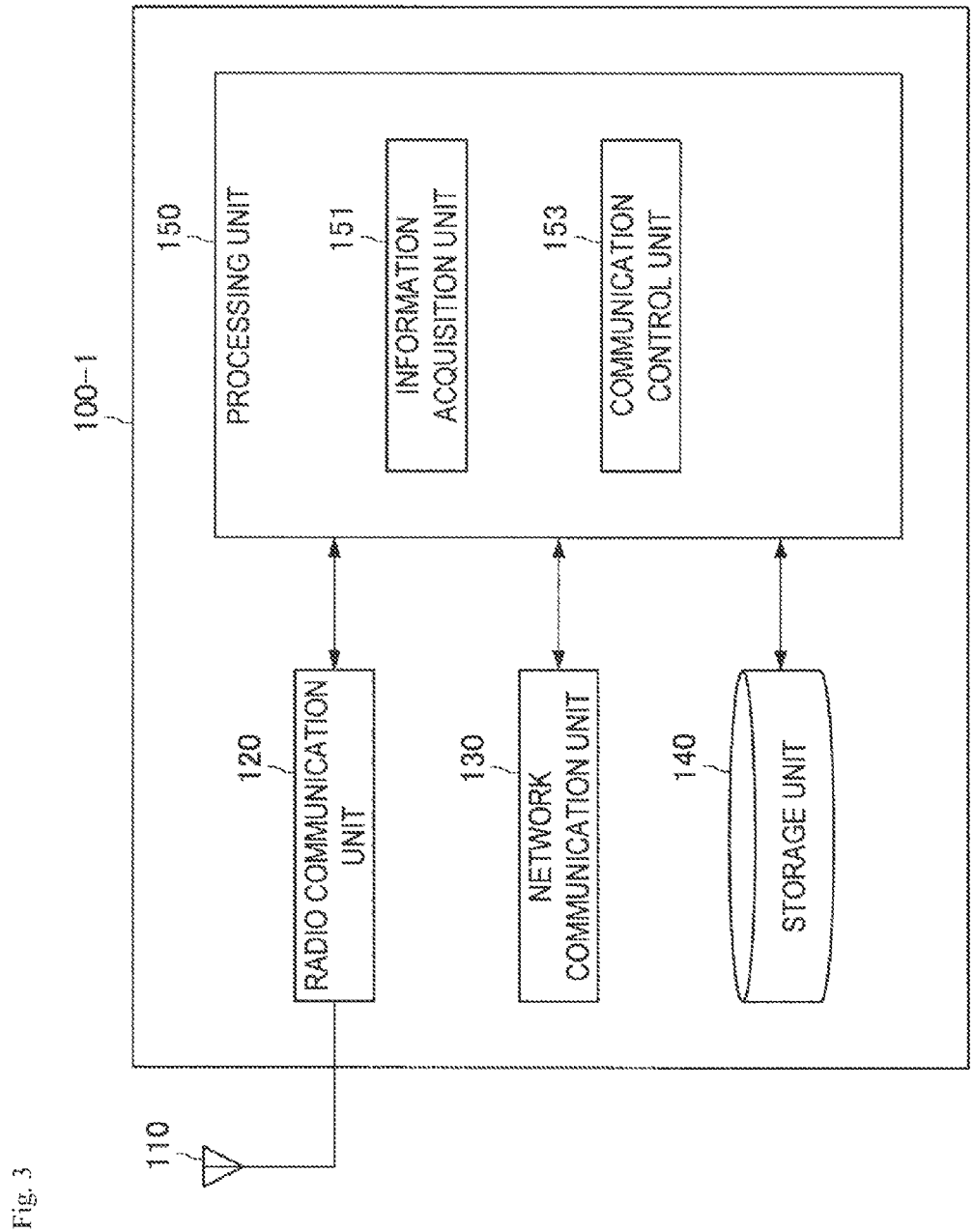
FIG. 3 is a block diagram illustrating an example of a configuration of a base station according to the first embodiment.

First, an example of a configuration of a base station 100-1 according to the first embodiment will be described with reference to FIGS. 3 to 5. FIG. 3 is a block diagram illustrating an example of a configuration of a base station 100-1 according to the first embodiment. Referring to FIG. 3, the base station 100-1 is equipped with an antenna unit 110, a radio communication unit 120, a network communication unit 130, a storage unit 140, and a processing unit 150.

(Antenna Unit 110)

The antenna unit 110 emits a signal output by the radio communication unit 120 into space as a radio wave. Additionally, the antenna unit 110 converts a radio wave from space into a signal, and outputs the signal to the radio communication unit 120.

(Radio Communication Unit 120)

The radio communication unit 120 conducts radio communication. For example, the radio communication unit 120 transmits a downlink signal to a terminal device 200-1 positioned inside the cell 10, and receives an uplink signal from a terminal device 200-1 positioned inside the cell 10.

(Network Communication Unit 130)

The network communication unit 130 communicates with other communication nodes. For example, the network communication unit 130 communicates with a core network and other base stations.

(Storage Unit 140)

The storage unit 140 temporarily or permanently stores programs and data for the operation of the base station 100-1.

(Processing Unit 150)

The processing unit 150 provides various functions of the base station 100-1. The processing unit 150 includes an information acquisition unit 151 and a communication control unit 153.

(Information Acquisition Unit 151)

The information acquisition unit 151 acquires information for the purpose of control by the communication control unit 153.

Particularly, in the first embodiment, the information acquisition unit 151 acquires carrier information indicating a CC for transmitting a discovery signal from among multiple CCs used for carrier aggregation. The discovery signal is a signal is a signal that enables another device to discover a device conducting D2D communication.

CC for Transmitting a Discovery Signal

First, FDD is adopted as the duplexing scheme, for example. In this case, the multiple CCs used for carrier aggregation include one or more downlink CCs, and one or more uplink CCs. Additionally, the CC for transmitting a discovery signal is one of the one or more uplink CCs, for example. In other words, the discovery signal is transmitted and received on an uplink CC.

Consequently, avoiding interference on communication between the base station 100-1 and a terminal device 200-1 becomes easier. This is because on the uplink, a signal may not be transmitted unless resources are allocated to a terminal device 200-1.

Second, the CC for transmitting a discovery signal is a component carrier indicated by individual carrier information transmitted by an individual terminal device 200-1, and is the CC on which that individual terminal device 200-1 transmits a discovery signal, for example. In other words, the carrier information indicates a CC on which an individual terminal device 200-1 transmits a discovery signal.

More specifically, as discussed later, a terminal device 200-1 transmits to the base station 100-1 individual carrier information indicating a CC on which that terminal device transmits a discovery signal, for example. Subsequently, the information acquisition unit 151 acquires the individual carrier information via the radio communication unit 120. The information acquisition unit 151 then generates the carrier information on the basis of the individual carrier information, and acquires the carrier information. Hereinafter, a specific example of a CC for transmitting a discovery signal will be described with reference to FIG. 4.

Figure 4:
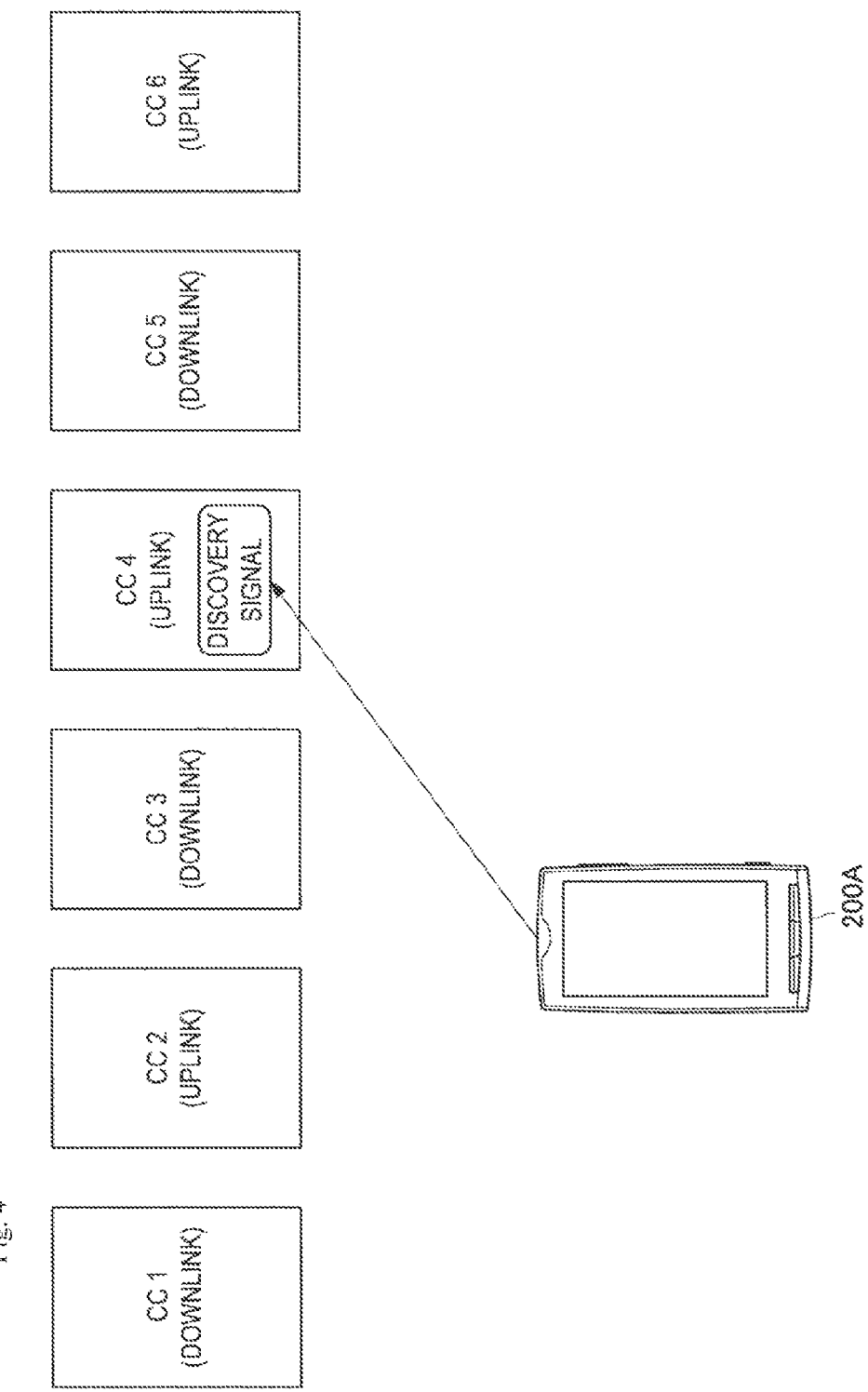
FIG. 4 is an explanatory diagram for illustrating a first example of a CC for transmitting a discovery signal.

FIG. 4 is an explanatory diagram for illustrating a first example of a CC for transmitting a discovery signal. Referring to FIG. 4, six CCs 1 to 6 are illustrated. Each of CC 1, CC 3, and CC 5 are downlink CCs, while each of CC 2, CC 4, and CC 6 are uplink CCs. For example, in the communication system 1 illustrated in FIG. 2, the terminal device 200A transmits a discovery signal on CC 4, while the terminal device 200B does not transmit a discovery signal. In this case, individual carrier information indicating CC 4 on which the terminal device 200A transmits a discovery signal is transmitted to the base station 100-1 by the terminal device 200A. The information acquisition unit 151 then generates the carrier information indicating CC 4 on the basis of the individual carrier information, and acquires the carrier information.

In the example illustrated in FIG. 4, one terminal device 200-1 (that is, the terminal device 200A) transmits a discovery signal, but the first embodiment is not limited to such an example. For example, two or more terminal devices 200-1 may transmit a discovery signal. Hereinafter, a specific example regarding this point will be described with reference to FIG. 5.

Figure 5:
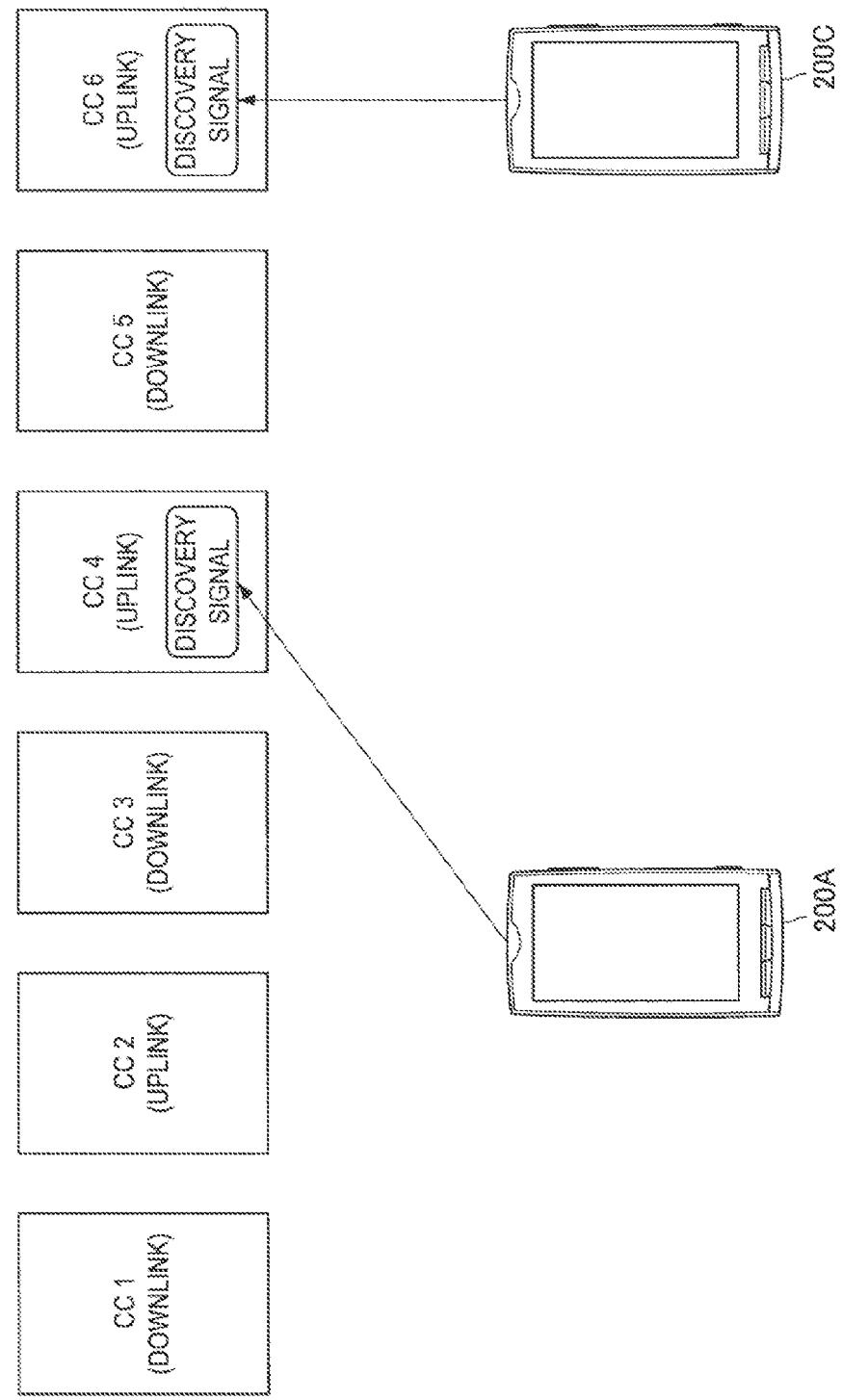
FIG. 5 is an explanatory diagram for illustrating a second example of a CC for transmitting a discovery signal.

FIG. 5 is an explanatory diagram for illustrating a second example of a CC for transmitting a discovery signal. Referring to FIG. 5, six CCs 1 to 6 are illustrated, similarly to FIG. 4. As discussed earlier, the terminal device 200A transmits a discovery signal on CC 4. Furthermore, the communication system 1 additionally includes a terminal device 200C, and the terminal device 200C transmits a discovery signal on CC 6. In this case, first individual carrier information indicating CC 4 on which the terminal device 200A transmits a discovery signal is transmitted to the base station 100-1 by the terminal device 200A. Also, second individual carrier information indicating CC 6 on which the terminal device 200C transmits a discovery signal is transmitted to the base station 100-1 by the terminal device 200C. The information acquisition unit 151 then generates carrier information indicating CC 4 and CC 6 on the basis of the first individual carrier information and the second individual carrier information, for example, and acquires the carrier information.

In the examples in FIGS. 4 and 5, one terminal device 200-1 (that is, the terminal device 200A or the terminal device 200C) transmits a discovery signal on one CC, but the first embodiment is not limited to such an example. One terminal device 200-1 may also transmit a discovery signal on two or more CCs. For example, in the example illustrated in FIG. 4, the terminal device 200A may also transmit a discovery signal on CC 2 in addition to CC 4. Additionally, the individual carrier information transmitted to the base station 100-1 by the terminal device 200A may indicate CC 2 and CC 4, and as a result, the carrier information may indicate CC 2 and CC 4.

Note that the carrier information may be generated per cell 10, or generated per an area smaller than the cell 10.

(Communication Control Unit 153)

The communication control unit 153 conducts control related to radio communication.

Particularly, in the first embodiment, the communication control unit 153 controls the transmission of the carrier information to the terminal device 200-1. In other words, according to control by the communication control unit 153, the base station 100-1 transmits the carrier information to the terminal device 200-1.

Consequently, it becomes possible to moderate the load on a terminal device 200-1 conducting D2D communication. Specifically, the load on the terminal device 200 for detecting a discovery signal may be moderated, and in addition, the load on the terminal device 200 for transmitting a discovery signal may also be moderated.

For example, with the carrier information, the terminal device 200-1 becomes able to learn which CC a discovery signal is transmitted on. For this reason, it is sufficient for the terminal device 200-1 to conduct a detection process for detecting a discovery signal on a signal transmitted on the CC that carries the discovery signal, without conducting the detection process on signals transmitted on other CCs. In other words, it is sufficient for the terminal device 200-1 to conduct the detection process on a limited CC. For this reason, the load on the terminal device 200-1 for detecting a discovery signal may be moderated.

As another example, the terminal device 200-1 that transmits a discovery signal does not need to transmit a discovery signal on all CCs for quick and easy detection of a discovery signal by another terminal device 200-1. In other words, the terminal device 200-1 may transmit a discovery signal on a limited CC. For this reason, the load on the terminal device 200-1 for transmitting a discovery signal may be moderated.

First Technique (System Information)

As a first example, the communication control unit 153 controls the transmission of system information that includes the carrier information. In other words, the carrier information is information included in system information, and according to control by the communication control unit 153, the base station 100-1 transmits the system information including the carrier information.

As a specific process, the communication control unit 153 may, for example, map a signal of system information including the carrier information onto a radio resource allocated to that system information. As a result, the carrier information is transmitted as part of the system information.

Consequently, even if, for example, the terminal device 200-1 is in an idle state (for example, Radio Resource Control Idle (RRC Idle)), the terminal device 200-1 becomes able to learn the CC that carries a discovery signal.

For this reason, it is possible to moderate not only the load on a terminal device 200-1 in a connected state (for example, Radio Resource Control Connected (RRC Connected)), but also the load on a terminal device 200-1 in an idle state.

Also, by transmitting the system information including the carrier information, even if a large number of terminal devices 200-1 are present inside the cell 10, the carrier information is transmitted all together to that large number of terminal devices 200-1. For this reason, increases in overhead due to the number of terminal devices 200-1 may be avoided.

Furthermore, the communication control unit 153 controls the transmission of the system information so that the system information is transmitted on each CC that carries a downlink signal from among the multiple CCs, for example. In other words, according to control by the communication control unit 153, the base station 100-1 transmits system information including the carrier information on each CC that carries a downlink signal.

Consequently, the terminal device 200-1 becomes able to acquire the system information including the carrier information and learn the CC that carries a discovery signal, irrespective of which CC carrying a downlink signal is used by that terminal device 200-1, for example.

Note that FDD is adopted as the duplexing scheme, for example. In this case, the CCs that carry a downlink signal are downlink CCs from among the multiple CCs. Referring again to FIG. 4, the system information including the carrier information is transmitted on each of CC 1, CC 3, and CC 5, for example. On the other hand, TDD may also be adopted as the duplexing scheme. In this case, the CCs that carry a downlink signal may be the multiple CCs themselves.

Second Technique (Signaling)

As a second example, the communication control unit 153 may also control the transmission of carrier information by signaling to an individual terminal device 200-1. In other words, according to control by the communication control unit 153, the base station 100-1 may transmit the carrier information by signaling to an individual terminal device 200-1.

As a specific process, the communication control unit 153 may, for example, map a signal of the carrier information onto a radio resource for signaling an individual terminal device 200-1. As a result, the carrier information is transmitted by signaling an individual terminal device 200-1.

Consequently, system information is not used to transmit the carrier information, for example. For this reason, the consumption of precious radio resources for system information may be avoided.

Also, by transmitting the carrier information by signaling, it becomes possible to moderate the load on a terminal device not conducting D2D communication, for example. More specifically, in the case in which the carrier information is included in system information, if the carrier information changes (that is, if the CC that carries a discovery signal changes), even a terminal device not conducting D2D communication will check the system information. For this reason, in the case in which the carrier information is included in system information, the load on a terminal device not conducting D2D communication may increase. However, by transmitting the carrier information by signaling, such a load is not produced. Thus, the load on a terminal device not conducting D2D communication may be moderated.

Furthermore, the carrier information transmitted by signaling an individual terminal device 200-1 may also indicate a CC used to transmit a discovery signal by a terminal device 200-1 positioned nearby the individual terminal device 200-1.

Referring again to FIG. 5, for example, carrier information transmitted by signaling a given terminal device 200-1 may also indicate CC 4 used to transmit a discovery signal by the terminal device 200A positioned nearby the given terminal device 200-1. In addition, carrier information transmitted by signaling another terminal device 200-1 may also indicate CC 6 used to transmit a discovery signal by the terminal device 200C positioned nearby the other terminal device 200-1.

Consequently, it is sufficient for a terminal device 200-1 detecting a discovery signal to conduct a detection process for detecting a discovery signal on a signal transmitted on a CC used to transmit a discovery signal by a terminal device 200-1 positioned nearby, for example. For this reason, the load on the terminal device 200-1 for detecting a discovery signal is further moderated.

Note that which terminal devices 200-1 are positioned near each other may also be decided on the basis of positioning information for the terminal devices 200-1. Additionally, such positioning information may be Global Positioning System (GPS) information provided by the terminal devices 200-1. Alternatively, the positioning information may be generated according to positioning using information such as the Timing Advance (TA) and Angle of Arrival (AOA) in LTE, or alternatively, may be generated according to positioning of a terminal device 200-1 by multiple base stations.

<3.2. Terminal Device Configuration>

Figure 6:
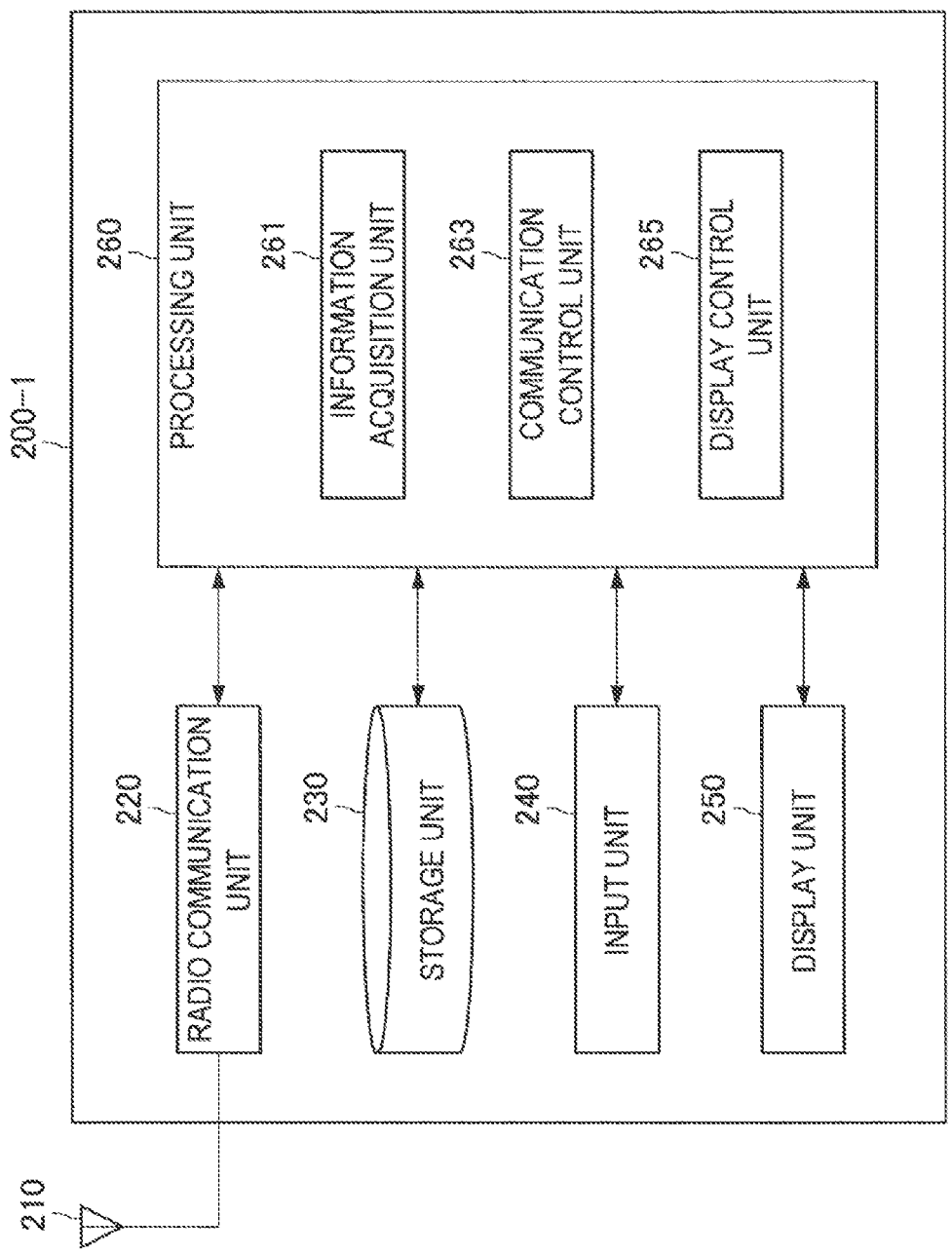
FIG. 6 is a block diagram illustrating an example of a configuration of a terminal device according to the first embodiment.

Next, an example of a configuration of a terminal device 200-1 according to the first embodiment will be described with reference to FIGS. 6 to 8. FIG. 6 is a block diagram illustrating an example of a configuration of a terminal device 200-1 according to the first embodiment. Referring to FIG. 6, the terminal device 200-1 is equipped with an antenna unit 210, a radio communication unit 220, a storage unit 230, an input unit 240, a display unit 250, and a processing unit 260.

(Antenna Unit 210)

The antenna unit 210 emits a signal output by the radio communication unit 220 into space as a radio wave. Additionally, the antenna unit 210 converts a radio wave from space into a signal, and outputs the signal to the radio communication unit 220.

(Radio Communication Unit 220)

The radio communication unit 220 conducts radio communication. For example, if the terminal device 200 is positioned inside the cell 10, the radio communication unit 220 receives a downlink signal from the base station 100, and transmits an uplink signal to the base station 100. As another example, in D2D communication, the radio communication unit 220 receives a signal from another terminal device 200, and transmits a signal to another terminal device 200.

(Storage Unit 230)

The storage unit 230 temporarily or permanently stores programs and data for the operation of the terminal device 200.

(Input Unit 240)

The input unit 240 receives input from a user of the terminal device 200. The input unit 240 then provides an input result to the processing unit 260.

(Display Unit 250)

The display unit 250 displays an output screen (that is, an output image) from the terminal device 200. For example, the display unit 250 displays an output screen according to control by the processing unit 260 (display control unit 265).

(Processing Unit 260)

The processing unit 260 provides various functions of the terminal device 200-1. The processing unit 260 includes an information acquisition unit 261, a communication control unit 263, and a display control unit 265.

(Information Acquisition Unit 261)

The information acquisition unit 261 acquires information for the purpose of control by the communication control unit 263.

The Case of the Terminal Device Transmitting a Discovery Signal

For example, the terminal device 200-1 transmits a discovery signal. In this case, particularly in the first embodiment, the information acquisition unit 261 acquires individual carrier information indicating a CC used by the terminal device 200-1 to transmit a discovery signal from among multiple CCs used for carrier aggregation, for example.

For example, the individual carrier information is stored in the storage unit 230. Subsequently, the information acquisition unit 261 acquires the individual carrier information from the storage unit 230.

As an example, referring again to the example of FIG. 4, the terminal device 200A transmits a discovery signal on CC 4 from among CC 1 to CC 6. In this case, the information acquisition unit 261 of the terminal device 200A acquires individual carrier information indicating CC 4.

Additionally, as another example, referring again to the example of FIG. 5, the terminal device 200C transmits a discovery signal on CC 6 from among CC 1 to CC 6. In this case, the information acquisition unit 261 of the terminal device 200C acquires individual carrier information indicating CC 6.

The Case of the Terminal Device Detecting a Discovery Signal

For example, the terminal device 200-1 conducts a detection process for detecting a discovery signal. In this case, particularly in the first embodiment, the information acquisition unit 261 acquires the carrier information. As discussed earlier, the carrier information is information indicating a CC for transmitting a discovery signal from among multiple CCs used for carrier aggregation.

For example, if the carrier information is transmitted by the base station 100, the information acquisition unit 261 acquires the carrier information via the radio communication unit 220.

As an example, referring again to the example of FIG. 4, the terminal device 200A transmits a discovery signal on CC 4 from among CC 1 to CC 6. In this case, the information acquisition unit 261 of the terminal device 200B acquires carrier information indicating CC 4.

Additionally, as another example, referring again to the example of FIG. 5, the terminal device 200A transmits a discovery signal on CC 4 from among CC 1 to CC 6, and the terminal device 200C transmits a discovery signal on CC 6 from among CC 1 to CC 6. In this case, the information acquisition unit 261 of the terminal device 200B acquires carrier information indicating CC 4 and CC 6.

(Communication Control Unit 263)

The communication control unit 263 conducts control related to radio communication by the terminal device 200-1.

The Case of the Terminal Device Transmitting a Discovery Signal

For example, the terminal device 200-1 transmits a discovery signal.

Controlling the Transmission of Individual Carrier Information

Particularly, in the first embodiment, the communication control unit 263 controls the transmission of the individual carrier information to the base station 100-1, for example. In other words, according to control by the communication control unit 263, the terminal device 200-1 transmits the individual carrier information to the base station 100-1.

As a specific process, the communication control unit 263 may, for example, map a signal of the individual carrier information onto an uplink radio resource allocated to the terminal device 200-1. As a result, the individual carrier information is transmitted to the base station 100-1.

Controlling the Transmission of a Discovery Signal

In addition, the communication control unit 263 controls the transmission of a discovery signal, for example.

For example, the communication control unit 263 controls the transmission of a discovery signal so that a discovery signal is transmitted on a CC used by the terminal device 200-1 to transmit a discovery signal, and so that a discovery signal is not transmitted on other CCs.

As a specific process, the communication control unit 263 may, for example, map a discovery signal onto a radio resource for transmitting a discovery signal. As a result, a discovery signal is transmitted.

Note that, as discussed earlier, the terminal device 200-1 may transmit a discovery signal on one CC, or transmit a discovery signal on two or more CCs.

The Case of the Terminal Device Detecting a Discovery Signal

For example, the terminal device 200-1 conducts a detection process for detecting a discovery signal. In this case, particularly in the first embodiment, the communication control unit 263 controls a detection process for detecting a discovery signal on the basis of the carrier information. In other words, the terminal device 200-1 conducts the detection process according to control by the communication control unit 263 based on the carrier information.

Specifically, the communication control unit 263 controls the detection process so that the detection process is conducted on a signal transmitted on a CC indicated by the carrier information, and so that the detection process is not conducted on signals transmitted on other CCs, for example. Hereinafter, specific examples regarding this point will be described with reference to FIGS. 7 and 8.

Figure 7:
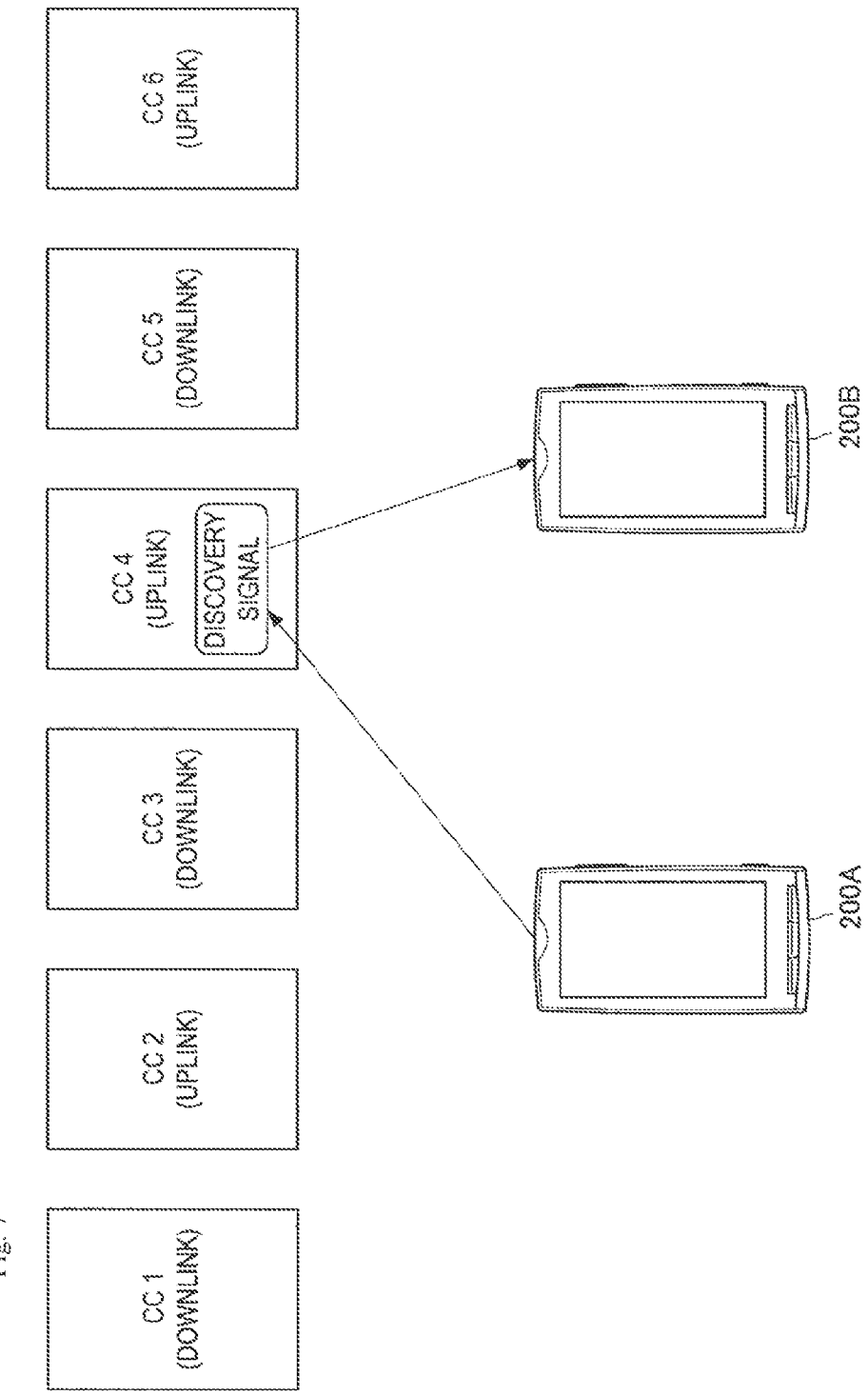
FIG. 7 is an explanatory diagram for illustrating a first example of a detection process for detecting a discovery signal in the first embodiment.

FIG. 7 is an explanatory diagram for illustrating a first example of a detection process for detecting a discovery signal in the first embodiment. Referring to FIG. 7, six CCs 1 to 6 are illustrated, similarly to FIG. 4. For example, as discussed earlier with reference to FIG. 4, the terminal device 200A transmits a discovery signal on CC 4, and the carrier information indicates CC 4. In this case, according to control by the communication control unit 263 of the terminal device 200B, the terminal device 200B conducts a detection process for detecting a discovery signal on a signal transmitted on CC 4, without conducting the detection process on signals transmitted on other CCs.

Figure 8:
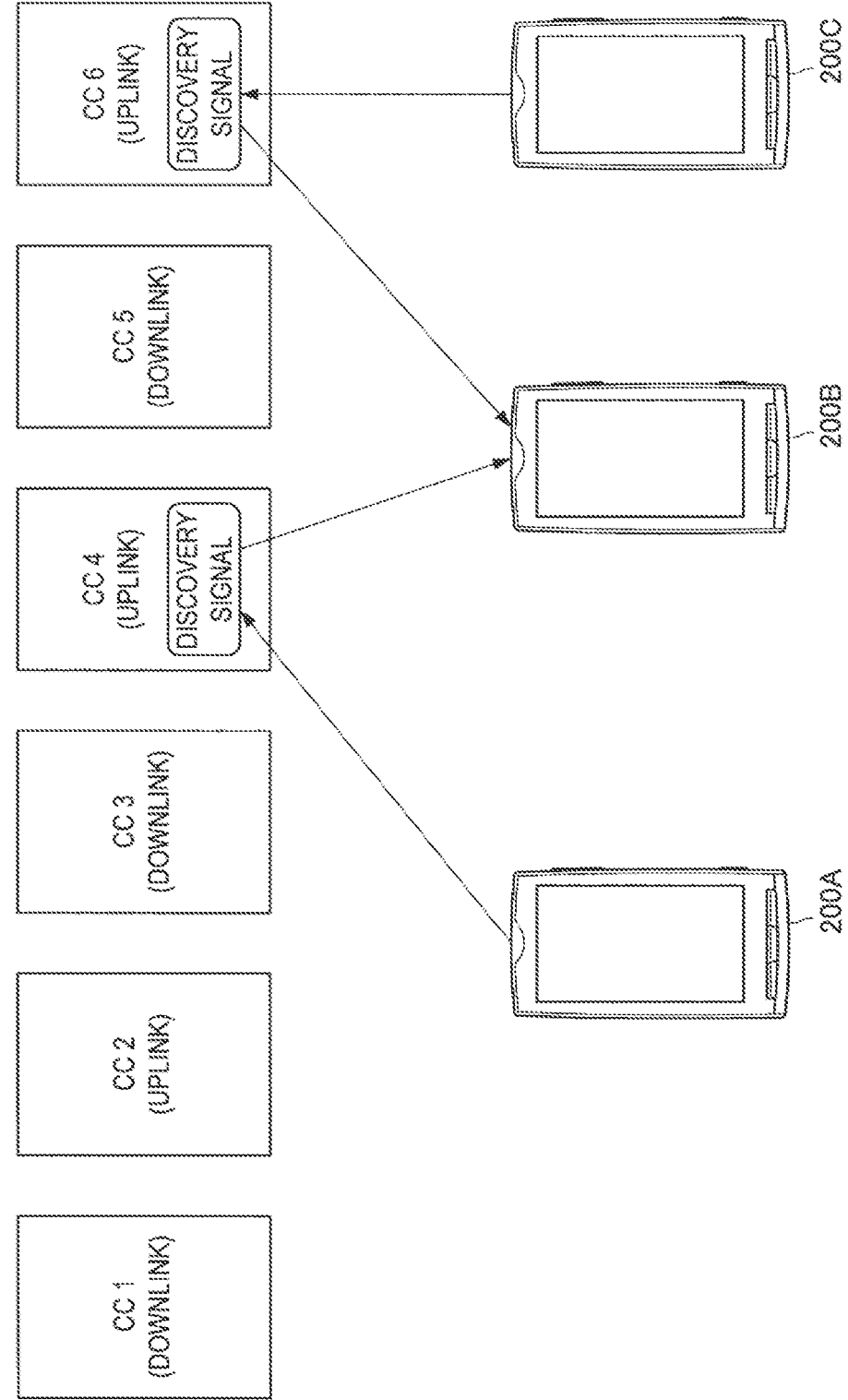
FIG. 8 is an explanatory diagram for illustrating a second example of a detection process for detecting a discovery signal in the first embodiment.

FIG. 8 is an explanatory diagram for illustrating a second example of a detection process for detecting a discovery signal in the first embodiment. Referring to FIG. 8, six CCs 1 to 6 are illustrated, similarly to FIG. 5. For example, as discussed earlier with reference to FIG. 5, the terminal device 200A transmits a discovery signal on CC 4, the terminal device 200C transmits a discovery signal on CC 6, and the carrier information indicates CC 4 and CC 6. In this case, according to control by the communication control unit 263 of the terminal device 200B, the terminal device 200B conducts the detection process on signals transmitted on CC 4 and CC 6, without conducting the detection process on signals transmitted on other CCs.

(Display Control Unit 265)

The display control unit 265 controls the display of an output screen by the display unit 250. For example, the display control unit 265 generates an output screen to be displayed by the display unit 250, and causes the display unit 250 to display that output screen.

<3.3. Process Flow>

Figure 9:
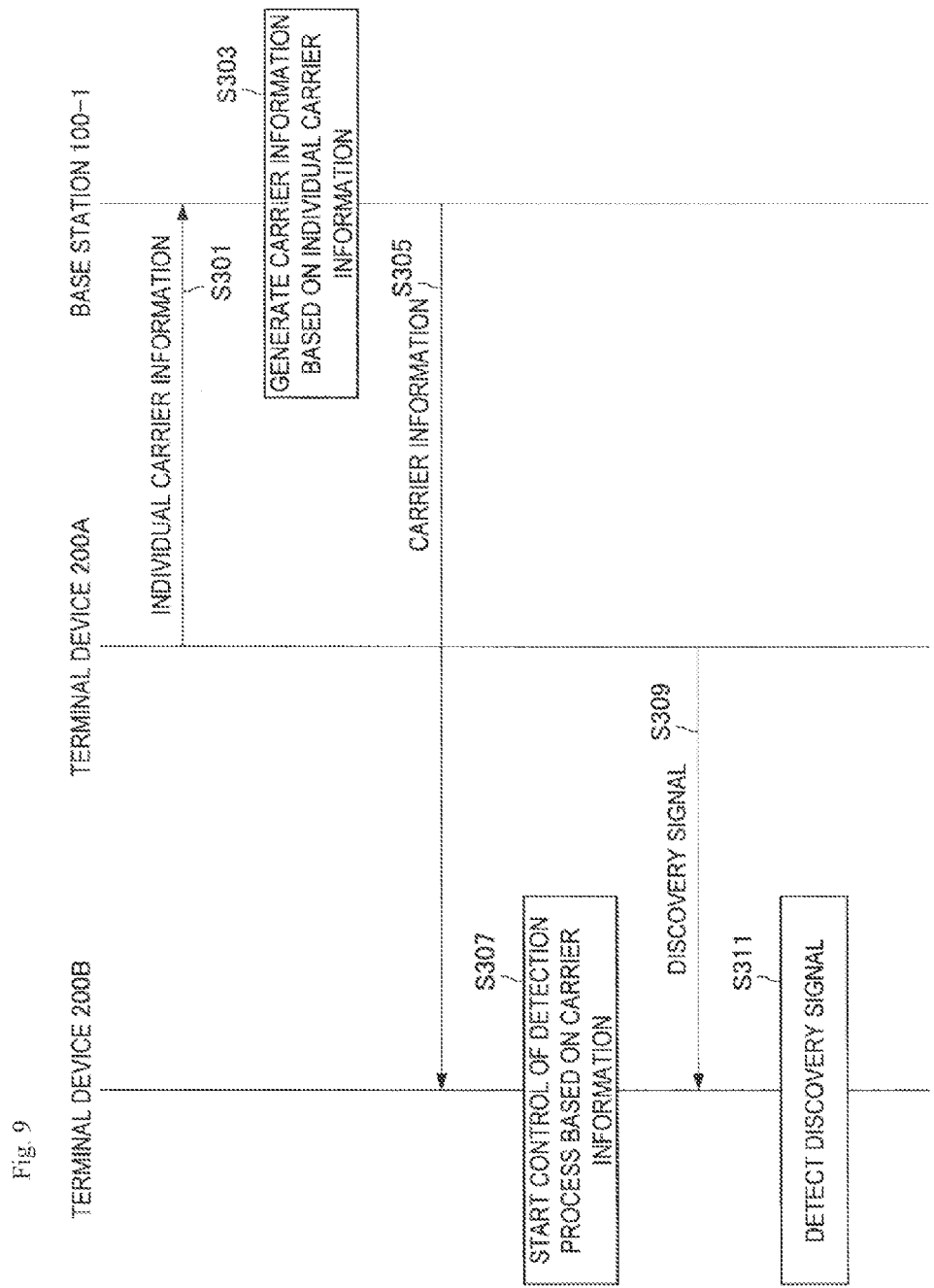
FIG. 9 is a sequence diagram illustrating an example of a diagrammatic flow of a communication control process according to the first embodiment.

Next, an example of a communication control process according to the first embodiment will be described with reference to FIG. 9. FIG. 9 is a sequence diagram illustrating an example of a diagrammatic flow of a communication control process according to the first embodiment.

The terminal device 200A transmits to the base station 100-1 individual carrier information indicating a CC used by the terminal device 200A to transmit a discovery signal from among multiple CCs used for carrier aggregation (S301).

Subsequently, the base station 100-1, on the basis of the individual carrier information, generates carrier information indicating a CC for transmitting a discovery signal from among the multiple CCs (S303). The base station 100-1 then transmits the carrier information to the terminal device 200B (S305). For example, the base station 100-1 transmits system information including the carrier information. Note that the carrier information may also be transmitted to the terminal device 200A.

After that, the terminal device 200B starts controlling a detection process (a detection process for detecting a discovery signal) based on the carrier information (S307). Specifically, the terminal device 200B starts the detection process on a signal transmitted on a CC indicated by the carrier information.

Subsequently, the terminal device 200A transmits a discovery signal on the CC used by the terminal device 200A to transmit a discovery signal (S309), and the terminal device 200B detects that discovery signal (S311).

<3.4. First Modification>

Next, a first modification of the first embodiment will be described. In the example of the first embodiment discussed above, a CC indicated by the carrier information (that is, a CC for transmitting a discovery signal) is a CC indicated by individual carrier information transmitted by an individual terminal device 200-1. On the other hand, in the first modification of the first embodiment, a CC indicated by the carrier information (that is, a CC for transmitting a discovery signal) is a CC designated by the base station 100-1.

(Base Station 100-1: Information Acquisition Unit 151)

CC for Transmitting a Discovery Signal

Particularly, in the first modification of the first embodiment, the CC for transmitting a discovery signal (that is, the CC indicated by the carrier information) is a CC designated by the base station 100-1.

For example, the carrier information is stored in the storage unit 140. Subsequently, the information acquisition unit 151 acquires the carrier information from the storage unit 140.

As an example, an operator of the communication system 1 selects one CC from among the multiple CCs as the CC designated by the base station 100-1. The operator then causes the storage unit 140 to store carrier information indicating the selected CC, for example. Subsequently, the information acquisition unit 151 acquires the carrier information from the storage unit 140.

As another example, the base station 100-1 may also automatically designate one CC from among the multiple CCs as a CC for transmitting a discovery signal. For example, the base station 100-1 may designate one of the multiple CCs on the basis of traffic conditions on multiple CCs. Subsequently, the base station 100-1 may store carrier information indicating the designated CC in the storage unit 140, and the information acquisition unit 151 may acquire the carrier information from the storage unit 140.

(Terminal Device 200-1: Information Acquisition Unit 261)

The Case of the Terminal Device Transmitting a Discovery Signal

For example, the terminal device 200-1 transmits a discovery signal. In this case, particularly in the first modification of the first embodiment, the information acquisition unit 261 acquires the carrier information, for example. This point is as discussed earlier regarding the case of the terminal device 200-1 detecting a discovery signal.

Note that in the first modification of the first embodiment, the information acquisition unit 261 may also not acquire the individual carrier information.

(Terminal Device 200-1: Communication Control Unit 263)

The Case of the Terminal Device Transmitting a Discovery Signal

For example, the terminal device 200-1 transmits a discovery signal.

Controlling the Transmission of Individual Carrier Information

In the first modification of the first embodiment, the individual carrier information may also not be transmitted to the base station 100-1. In other words, the communication control unit 263 may also not control the transmission of the individual carrier information.

Controlling the Transmission of a Discovery Signal

The communication control unit 263 controls the transmission of a discovery signal, for example.

Particularly, in the first modification of the first embodiment, the communication control unit 263 controls the transmission of a discovery signal on the basis of the carrier information.

For example, the communication control unit 263 controls the transmission of a discovery signal so that a discovery signal is transmitted on a CC indicated by the carrier information, and so that a discovery signal is not transmitted on other CCs.

(Process Flow)

Figure 10:
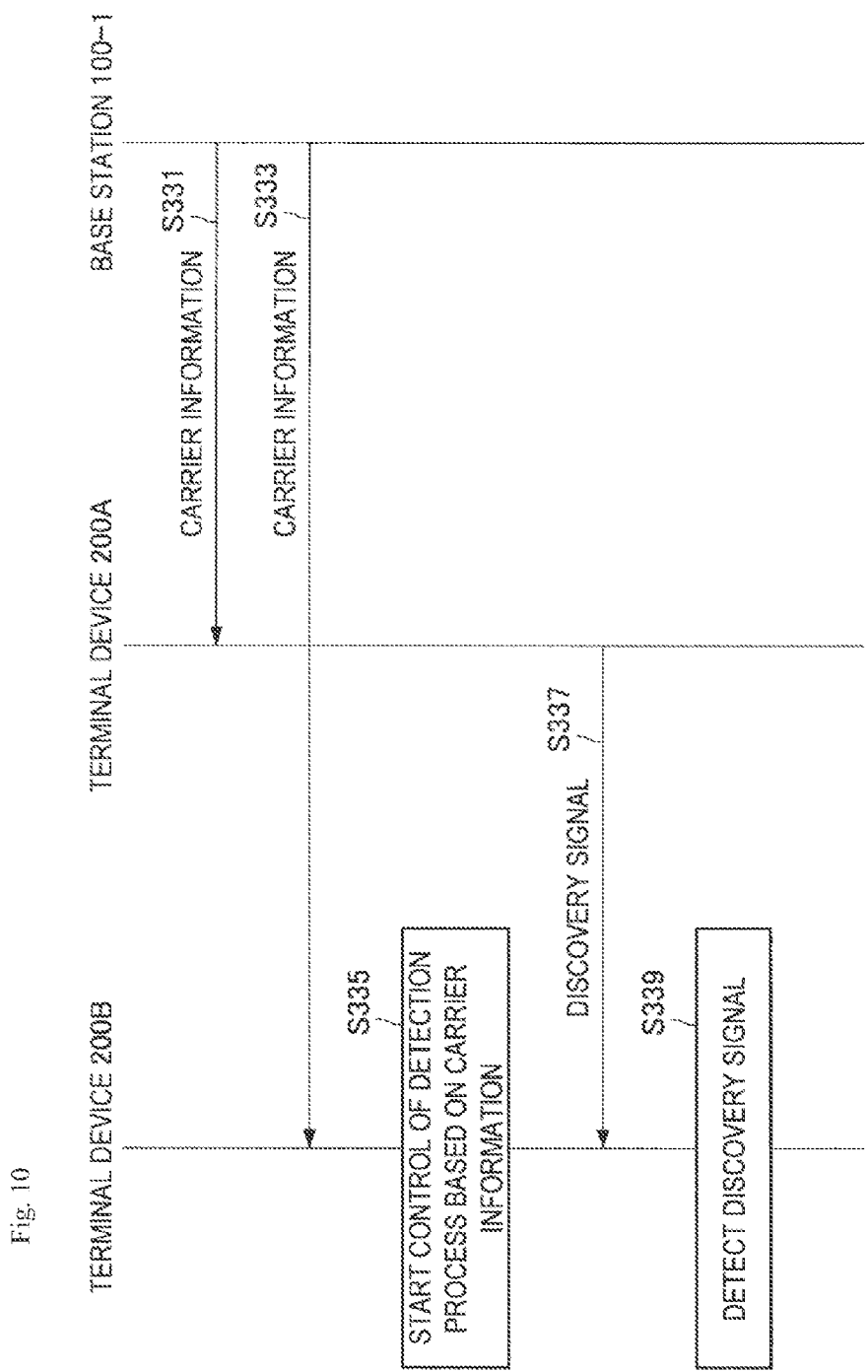
FIG. 10 is a sequence diagram illustrating an example of a diagrammatic flow of a communication control process according to a first modification of the first embodiment.

FIG. 10 is a sequence diagram illustrating an example of a diagrammatic flow of a communication control process according to a first modification of the first embodiment.

The base station 100-1 transmits to the terminal device 200A and the terminal device 200B carrier information indicating a CC for transmitting a discovery signal from among the multiple CCs (S331, S333). For example, the base station 100-1 transmits system information including the carrier information.

After that, the terminal device 200B starts controlling a detection process (a detection process for detecting a discovery signal) based on the carrier information (S335). Specifically, the terminal device 200B starts the detection process on a signal transmitted on a CC indicated by the carrier information.

Subsequently, the terminal device 200A transmits a discovery signal on the CC indicated by the carrier information (S337), and the terminal device 200B detects that discovery signal (S339).

<3.5. Second Modification>

Next, a second modification of the first embodiment will be described.

In the example of the first embodiment discussed earlier, carrier information (transmitted by the base station 100-1 to the terminal device 200-1) is information indicating a CC for transmitting a discovery signal from among multiple CCs used for carrier aggregation. However, the first embodiment is not limited to such an example.

In the second modification of the first embodiment, carrier information (transmitted by the base station 100-1 to the terminal device 200-1) is information indicating a CC for transmitting a signal related to D2D communication (hereinafter called a "D2D-related signal") from among multiple CCs used for carrier aggregation. In other words, in the second modification, the carrier information is information indicating a CC usable for D2D communication from among multiple CCs used for carrier aggregation.

(D2D-Related Signal)

For example, the D2D-related signal includes a D2D communication signal. More specifically, the D2D-related signal includes a D2D communication data signal and/or control signal, for example.

For example, the D2D-related signal includes a signal for starting D2D communication. More specifically, the D2D-related signal may include a signal such as, for example, a signal for the purpose of synchronization (for example, a synchronization signal), a signal for the purpose of discovery (for example, a discovery signal), and/or a control signal for the purpose of connection establishment (for example, a signal of a message in a connection establishment procedure).

(Description of Specific Operations)

Note that in the example of the first embodiment (as well as the first modification of the first embodiment) discussed earlier, the signal in question is a discovery signal, whereas in the second modification of the first embodiment, the signal in question is a D2D-related signal. With the exception of this point, there is no difference between the description of the example of the first embodiment (as well as the first modification of the first embodiment) discussed earlier, and the description of the second modification of the first embodiment. Consequently, duplicate description will be reduced or omitted herein.

Note that to describe the second modification of the first embodiment, the term "discovery signal" (that is, "a discovery signal that enables another device to discover a device conducting D2D communication") may be substituted with the term "D2D-related signal" (that is, "a signal related to D2D communication") in the description of the example of the first embodiment (as well as the first modification of the first embodiment) discussed earlier.

For example, with regard to the base station 100-1, in the second modification of the first embodiment, the information acquisition unit 151 acquires carrier information indicating a CC for transmitting a D2D-related signal from among multiple CCs used for carrier aggregation. The communication control unit 153 controls the transmission of the carrier information to the terminal device 200-1.

For example, with regard to the terminal device 200-1, in the second modification of the first embodiment, the information acquisition unit 261 acquires carrier information indicating a CC for transmitting a D2D-related signal from among multiple CCs used for carrier aggregation. The communication control unit 263 controls the transmission of a D2D-related signal on the basis of the carrier information.

Consequently, it becomes possible to moderate the load on a device conducting D2D communication.

<<4. Second Embodiment>>

Figure 11:
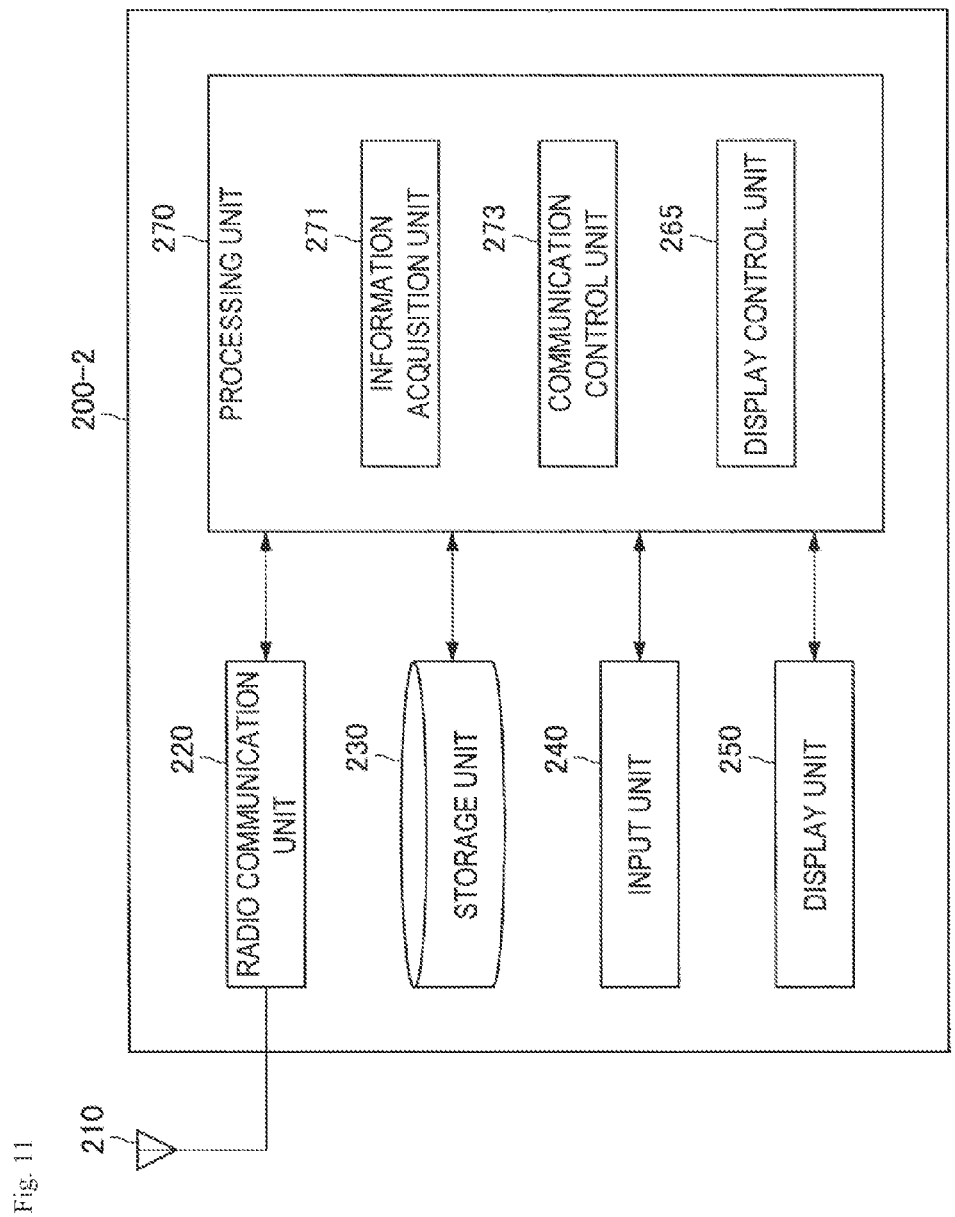
FIG. 11 is a block diagram illustrating an example of a configuration of a terminal device according to the second embodiment.

Next, a second embodiment of the present disclosure will be described with reference to FIGS. 11 to 13.

In the second embodiment, a terminal device 200 that transmits a discovery signal transmits a discovery signal on each of multiple CCs used for carrier aggregation. Additionally, a terminal device 200 that detects a discovery signal conducts a detection process for detecting a discovery signal on a signal transmitted on one CC from among the multiple CCs. Consequently, it becomes possible to moderate the load on a terminal device 200 conducting D2D communication. Specifically, the load on a terminal device 200 for detecting a discovery signal may be moderated, for example.

<4.1. Terminal Device Configuration>

First, an example of a configuration of a terminal device 200-2 according to the second embodiment will be described with reference to FIGS. 11 and 12. FIG. 11 is a block diagram illustrating an example of a configuration of a terminal device 200-2 according to the second embodiment. Referring to FIG. 11, the terminal device 200-2 is equipped with an antenna unit 210, a radio communication unit 220, a storage unit 230, an input unit 240, a display unit 250, and a processing unit 270.

Note that for the antenna unit 210, the radio communication unit 220, the storage unit 230, the input unit 240, the display unit 250, and the display control unit 265, there is no difference between the first embodiment and the second embodiment. Thus, at this point, only the information acquisition unit 271 and the communication control unit 273 included in the processing unit 270 will be described.

(Information Acquisition Unit 271)

The information acquisition unit 271 acquires information for the purpose of control by the communication control unit 273.

The Case of the Terminal Device Transmitting a Discovery Signal

For example, the terminal device 200-2 transmits a discovery signal. In this case, the information acquisition unit 271 acquires information related to each of multiple CCs used for carrier aggregation.

FDD is adopted as the duplexing scheme, for example. In this case, each of the multiple CCs is an uplink CC, for example.

For example, information related to each of the multiple CCs is transmitted by a base station 100-2. As an example, the information related to each of the multiple CCs may include information such as information on the bandwidth of each of the multiple CCs, information on the center frequency of each of the multiple CCs, and/or identification information for identifying each of the multiple CCs.

The Case of the Terminal Device Detecting a Discovery Signal

For example, the terminal device 200-2 conducts a detection process for detecting a discovery signal. In this case, the information acquisition unit 271 acquires information related to one CC from among multiple CCs used for carrier aggregation.

Also, the one CC is a primary component carrier (PCC) for the terminal device 200-2, for example. Also, the one CC is an uplink CC, for example. In other words, the one CC is an uplink PCC.

For example, the information related to the one CC is transmitted by the base station 100-2. As an example, the information related to the one CC may include information such as information on the bandwidth of the one CC, information on the center frequency of the one CC, and/or identification information for identifying the one CC.

(Communication Control Unit 273)

The communication control unit 273 conducts control related to radio communication by the terminal device 200-2.

The Case of the Terminal Device Transmitting a Discovery Signal

For example, the terminal device 200-2 transmits a discovery signal. In this case, particularly in the second embodiment, the communication control unit 273 controls the transmission of the discovery signal so that the discovery signal is transmitted on each of the multiple CCs. In other words, according to control by the communication control unit 273, the terminal device 200-2 transmits a discovery signal on each of the multiple CCs.

As discussed earlier, FDD is adopted as the duplexing scheme, and each of the multiple CCs is an uplink CC, for example. In this case, according to control by the communication control unit 273, the terminal device 200-2 transmits a discovery signal on each of the multiple uplink CCs. Consequently, avoiding interference on communication between the base station 100-2 and the terminal device 200-2 becomes easier. This is because on the uplink, a signal may not be transmitted unless resources are allocated to the terminal device 200-2.

As a specific process, the communication control unit 273 may, for example, map a discovery signal onto a radio resource for transmitting a discovery signal in each of the multiple CCs (for example, multiple uplink CCs). As a result, a discovery signal is transmitted on each of the multiple CCs.

Consequently, it becomes possible to detect a discovery signal on each of multiple CCs (for example, multiple uplink CCs), for example. For this reason, it is sufficient to conduct a detection process for detecting a discovery signal on a signal transmitted on any one of the CCs, without conducting the detection process on signals transmitted on the other CCs. Thus, the load on the terminal device 200-2 for detecting a discovery signal is moderated.

The Case of the Terminal Device Detecting a Discovery Signal

For example, the terminal device 200-2 conducts a detection process for detecting a discovery signal. In this case, particularly in the second embodiment, the communication control unit 273 controls a detection process for detecting a discovery signal so that the detection process is conducted on a signal transmitted on the one CC from among the multiple CCs. In other words, according to control by the communication control unit 273, the terminal device 200-2 conducts the detection process on a signal transmitted on the one CC.

As discussed earlier, the one CC is a PCC for the terminal device 200-2, for example. Also, the one CC is an uplink CC, for example. In other words, the one CC is an uplink PCC. In this case, according to control by the communication control unit 273, the terminal device 200-2 conducts the detection process on a signal transmitted on an uplink PCC. Hereinafter, a specific example regarding this point will be described with reference to FIG. 12.

Figure 12:
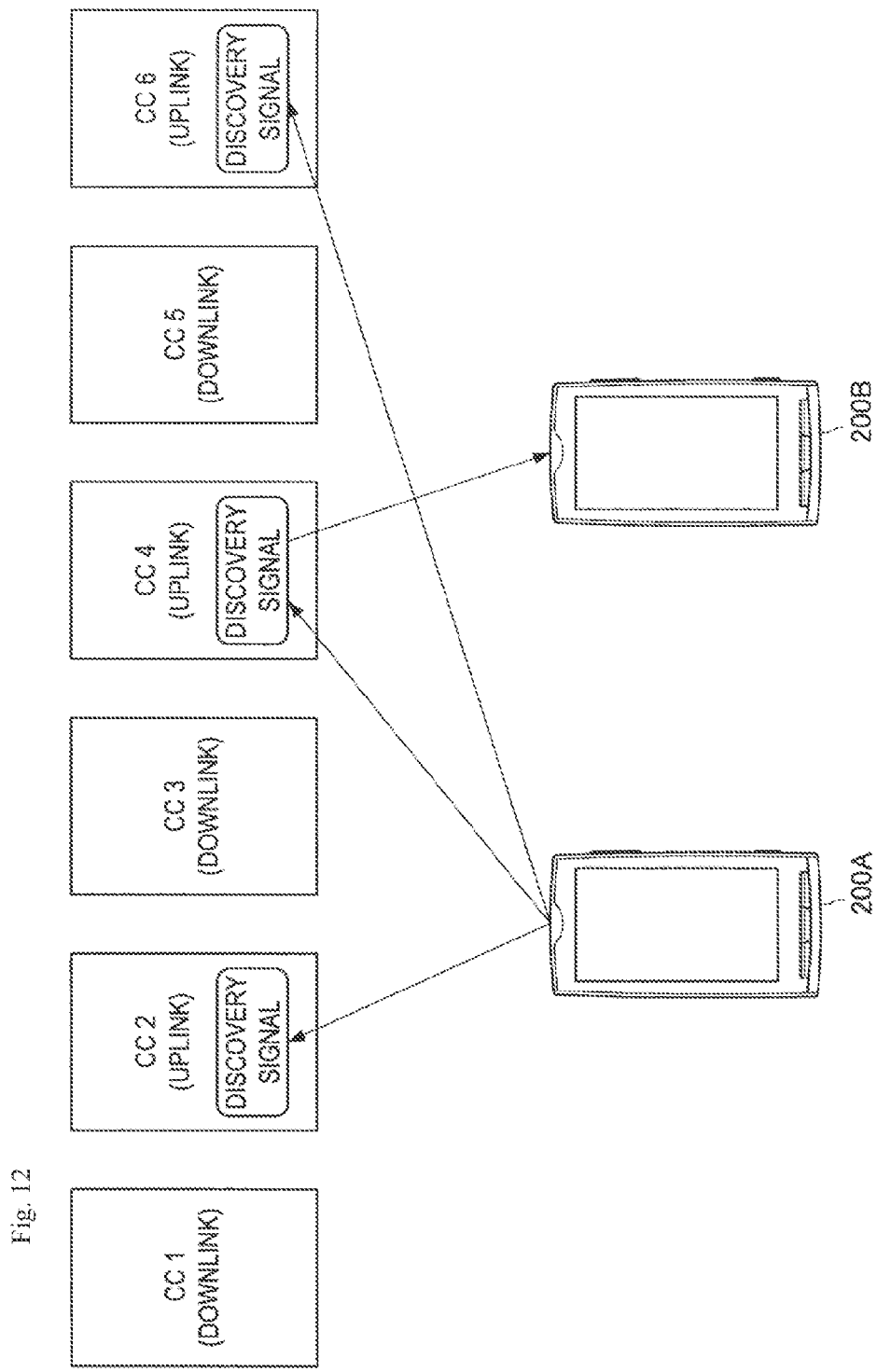
FIG. 12 is an explanatory diagram for illustrating an example of a detection process for detecting a discovery signal in the second embodiment.
Figure 13:
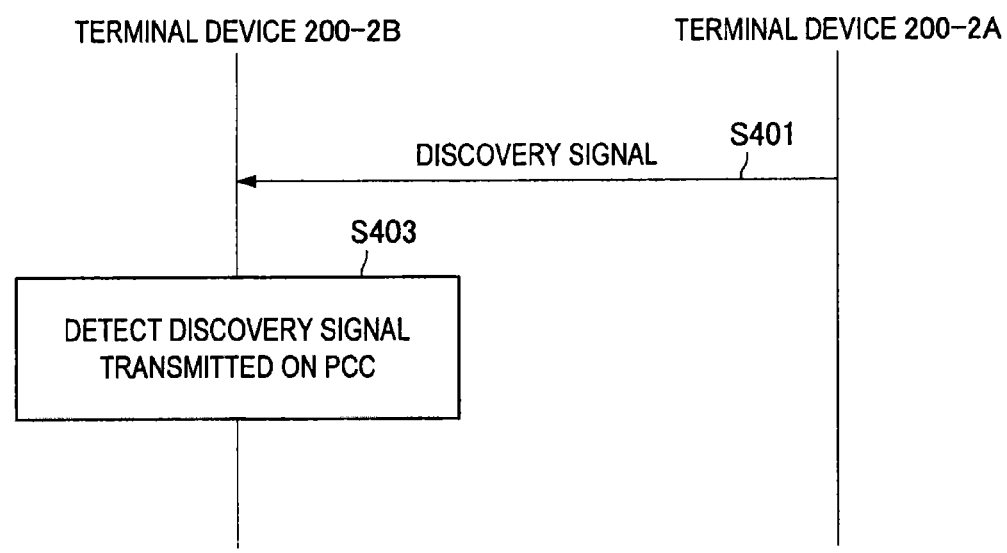
FIG. 13 is a sequence diagram illustrating an example of a diagrammatic flow of a communication control process according to the second embodiment.

FIG. 12 is an explanatory diagram for illustrating an example of a detection process for detecting a discovery signal in the second embodiment. Referring to FIG. 12, six CCs 1 to 6 are illustrated. Each of CC 1, CC 3, and CC 5 are downlink CCs, while each of CC 2, CC 4, and CC 6 are uplink CCs. For example, in the communication system 1 illustrated in FIG. 2, the terminal device 200A transmits a discovery signal on CC 4, while the terminal device 200B does not transmit a discovery signal. In this case, according to control by the communication control unit 273 of the terminal device 200A, the terminal device 200A transmits a discovery signal on multiple uplink CCs, namely, CC 2, CC 4, and CC 6. Meanwhile, the uplink PCC for the terminal device 200B is CC 4. In this case, according to control by the communication control unit 273 of the terminal device 200B, the terminal device 200B conducts a detection process for detecting a discovery signal on a signal transmitted on CC 4, without conducting the detection process on signals transmitted on other CCs.

Consequently, the load on a terminal device 200-2 for detecting a discovery signal may be moderated, for example.

<4.2. Process Flow>

Next, an example of a communication control process according to the second embodiment will be described with reference to FIG. 13. FIG. 13 is a sequence diagram illustrating an example of a diagrammatic flow of a communication control process according to the second embodiment.

The terminal device 200A transmits a discovery signal on each of multiple CCs used for carrier aggregation (S401). Each of the multiple CCs is an uplink CC, for example.

The terminal device 200B conducts a detection process for detecting a discovery signal on a signal transmitted on the PCC for the terminal device 200B from among the multiple CCs, and detects a discovery signal transmitted on the PCC (S403).

<<5. Third Embodiment>>

Next, a third embodiment of the present disclosure will be described with reference to FIGS. 14 to 17.

In the third embodiment, after a terminal device 200 detects a discovery signal transmitted by another terminal device 200, the terminal device 200 relays the discovery signal on a CC that does not carry a discovery signal transmitted by the other terminal device 200 from among the multiple CCs. Consequently, it becomes possible to transmit a discovery signal on more CCs, for example.

<5.1. Terminal Device Configuration>

Figure 14:
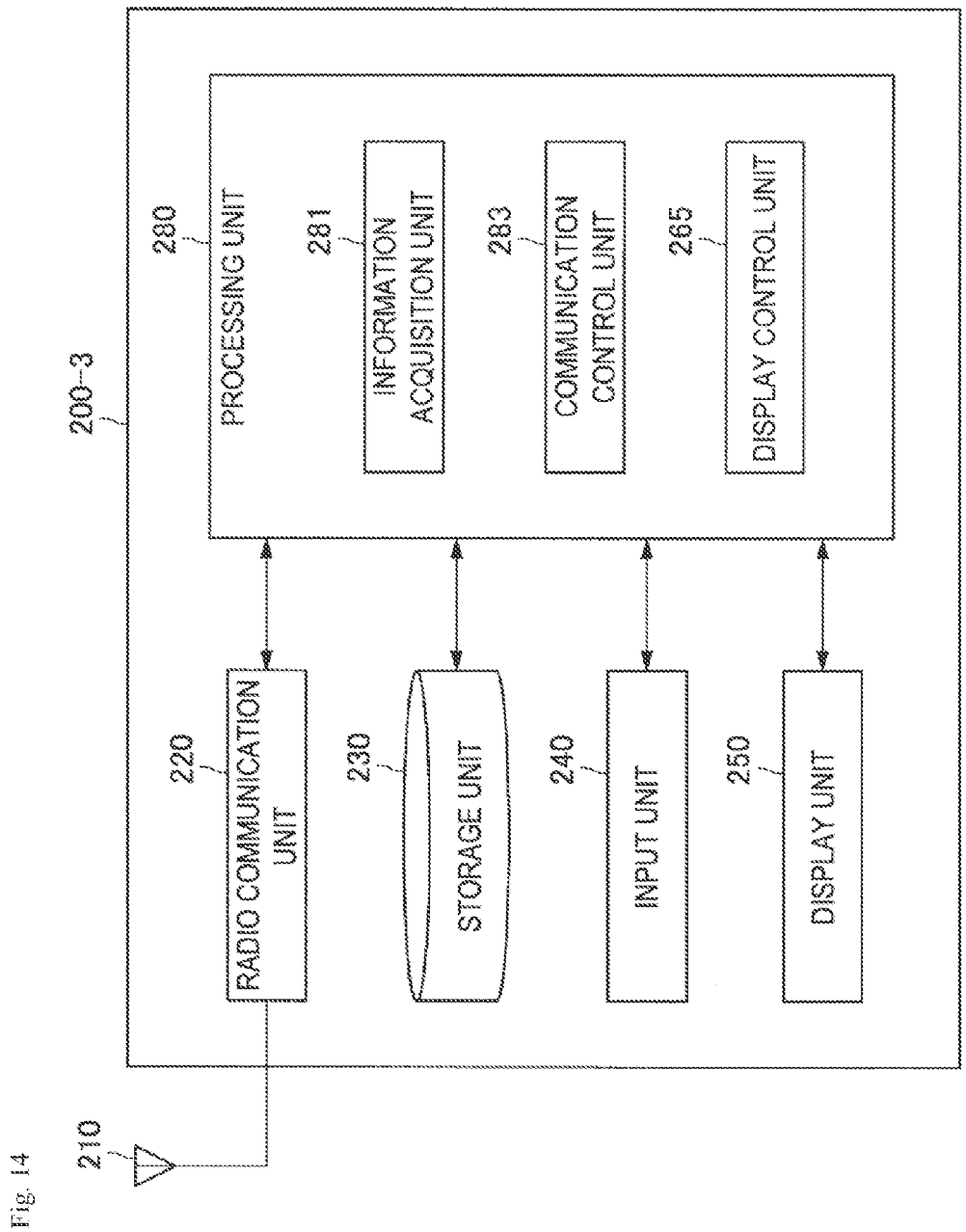
FIG. 14 is a block diagram illustrating an example of a configuration of a terminal device according to the third embodiment.

First, an example of a configuration of a terminal device 200-3 according to the third embodiment will be described with reference to FIGS. 14 and 15. FIG. 14 is a block diagram illustrating an example of a configuration of a terminal device 200-3 according to the third embodiment. Referring to FIG. 14, the terminal device 200-3 is equipped with an antenna unit 210, a radio communication unit 220, a storage unit 230, an input unit 240, a display unit 250, and a processing unit 280.

Note that for the antenna unit 210, the radio communication unit 220, the storage unit 230, the input unit 240, the display unit 250, and the display control unit 265, there is no difference between the first embodiment and the third embodiment. Thus, at this point, only the information acquisition unit 281 and the communication control unit 283 included in the processing unit 280 will be described.

(Information Acquisition Unit 281)

The information acquisition unit 281 acquires information for the purpose of control by the communication control unit 283.

For example, the information acquisition unit 281 acquires information related to CCs usable by the terminal device 200-3. Specifically, the information related to the CCs usable by the terminal device 200-3 are stored in the storage unit 230, for example. Subsequently, the information acquisition unit 281 acquires the information from the storage unit 230.

As an example, the information related to the CCs usable by the terminal device 200-3 may include information such as information on the bandwidth of each of the CCs, information on the center frequency of each of the CCs, and/or identification information for identifying each of the CCs.

(Communication Control Unit 283)

The communication control unit 283 conducts control related to radio communication by the terminal device 200-3.

The Case of the Terminal Device Transmitting a Discovery Signal

For example, the terminal device 200-3 transmits a discovery signal.

Particularly, in the third embodiment, when transmitting a discovery signal, the communication control unit 283 requests relaying of the discovery signal to another terminal device 200-3 that will detect that discovery signal, for example.

As an example, the communication control unit 283 controls the transmission of relay request information for requesting relaying of a discovery signal so that such relay request information is transmitted when transmitting the discovery signal. In other words, according to control by the communication control unit 283, the terminal device 200-3 transmits the relay request information when transmitting a discovery signal. The relay request information may be included within the discovery signal, or transmitted accompanying a discovery signal.

As another example, the communication control unit 283 may also control the transmission of a discovery signal so that a discovery signal is transmitted on a specific radio resource associated with relaying a discovery signal. In other words, according to control by the communication control unit 283, the terminal device 200-3 may also transmit a discovery signal on a specific radio resource. In this way, the relaying of a discovery signal may also be requested.

Note that the communication control unit 283 may, for example, not request the relay when relaying a discovery signal, and request the relay when transmitting a new discovery signal from the terminal device 200-3. In other words, the relaying of a discovery signal is conducted only once.

The Case of the Terminal Device Detecting a Discovery Signal

For example, the terminal device 200-3 conducts a detection process for detecting a discovery signal. In this case, particularly in the third embodiment, after detecting a discovery signal transmitted by another terminal device 200-3, the communication control unit 283 controls the transmission of a discovery signal so that a discovery signal is relayed on a CC that does not carry a discovery signal transmitted by the other terminal device 200-3 from among the multiple CCs.

FDD is adopted as the duplexing scheme, for example. In this case, each of the multiple CCs is an uplink CC, for example.

Specifically, if a discovery signal transmitted by another terminal device 200-3 is detected, the communication control unit 283 compares the CCs usable by the terminal device 200-3 from among the multiple CCs to the CCs usable by the other terminal device 200-3 from among the multiple CCs, for example. The CCs usable by the other terminal device 200-3 may be identified by detecting a discovery signal, or identified from information transmitted by the other terminal device 200-3. Subsequently, the communication control unit 283 identifies a CC unusable by the other terminal device 200-3 from among the CCs usable by the terminal device 200-3 (that is, a CC that does not carry a discovery signal transmitted by the other terminal device 200-3). Subsequently, according to control by the communication control unit 283, the terminal device 200-3 relays the detected discovery signal on the identified CC. Hereinafter, a specific example of relaying a discovery signal will be described with reference to FIG. 15.

Figure 15:
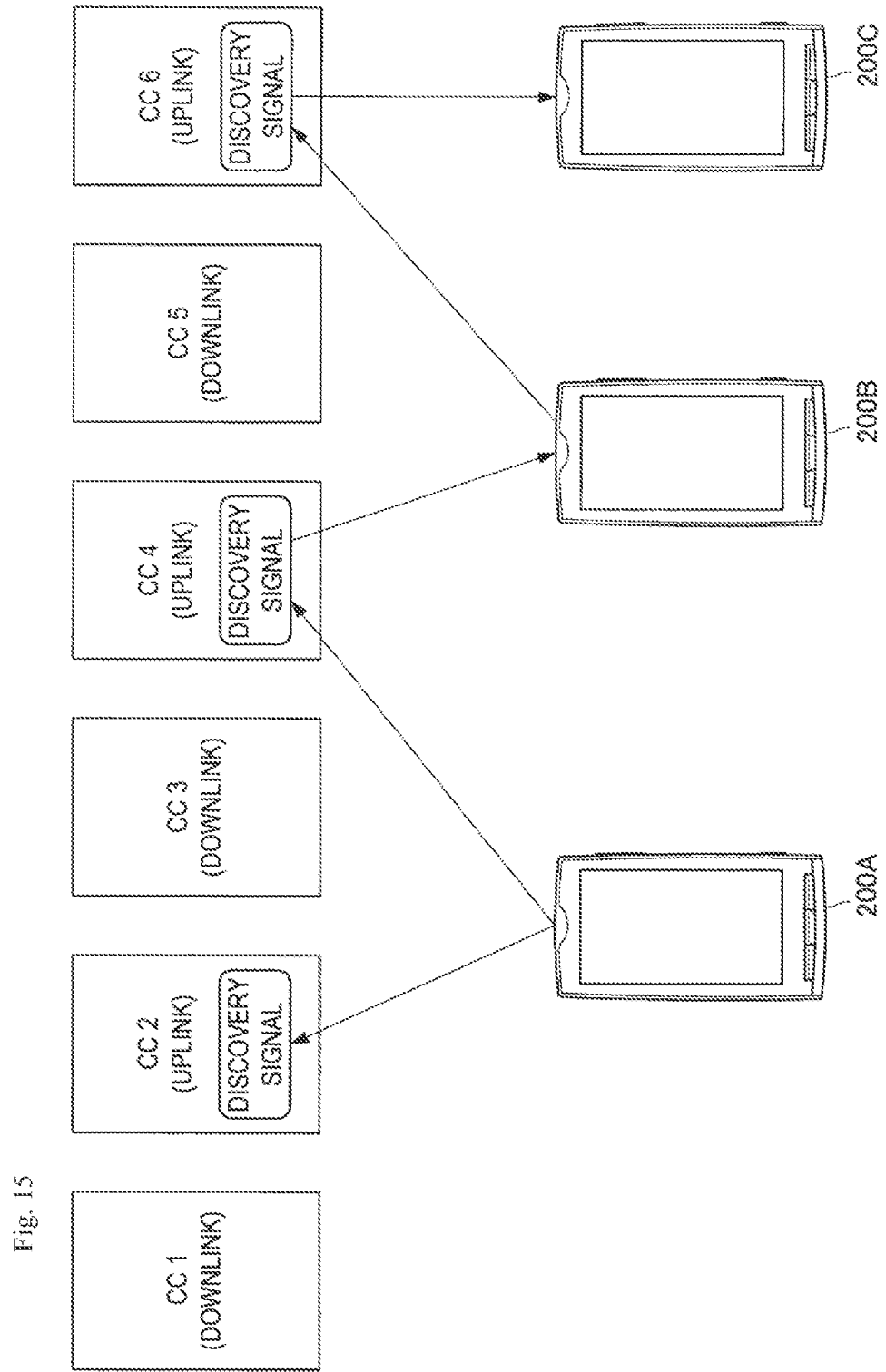
FIG. 15 is an explanatory diagram for illustrating an example of relaying a discovery signal in the third embodiment.

FIG. 15 is an explanatory diagram for illustrating an example of relaying a discovery signal in the third embodiment. Referring to FIG. 15, six CCs 1 to 6 are illustrated. Each of CC 1, CC 3, and CC 5 are downlink CCs, while each of CC 2, CC 4, and CC 6 are uplink CCs. For example, the terminal device 200A is able to use CC 2 and CC 4 from among multiple uplink CCs (that is, CC 2, CC 4, and CC 6). Meanwhile, the terminal device 200B is able to use CC 4 and CC 6 from among the multiple uplink CCs. In addition, the terminal device 200C is able to use CC 6 from among the multiple uplink CCs. In this case, the terminal device 200A transmits a discovery signal on CC 2 and CC 4, and the terminal device 200B detects the discovery signal transmitted on CC 4, for example. Subsequently, the terminal device 200B relays the discovery signal on CC 6, which is unusable by the terminal device 200A. Subsequently, the terminal device 200C detects the relayed discovery signal.

A discovery signal is relayed in this way, for example. Consequently, it becomes possible to transmit a discovery signal on more CCs, for example. Such relaying is particularly effective in the case in which the meaning to be reported is immediately identifiable by detecting a discovery signal, for example. Such relaying is also particularly effective in the case in which D2D communication is used for public safety, for example, since fast reporting is demanded.

Note that in the case in which the discovery signal transmitted by the other terminal device 200-3 is a discovery signal relayed by the other terminal device 200-3, for example, the communication control unit 283 controls the transmission of the discovery signal so that the discovery signal is not relayed further.

Specifically, as discussed earlier, if a transmitted discovery signal is a newly transmitted discovery signal, the other terminal device 200-3 that transmits the discovery signal requests relaying of the discovery signal, for example. In this case, according to control by the communication control unit 283, the terminal device 200-3 relays the discovery signal. On the other hand, as discussed earlier, if a transmitted discovery signal is a relayed discovery signal, the other terminal device 200-3 that transmits the discovery signal does not request relaying of the discovery signal. In this case, according to control by the communication control unit 283, the terminal device 200-3 does not relay the discovery signal.

Consequently, it becomes possible to avoid repeated relaying, for example.

<5.2. Process Flow>

Next, an example of a communication control process according to the third embodiment will be described with reference to FIGS. 16 and 17.

(Overall Process Flow)

Figure 16:
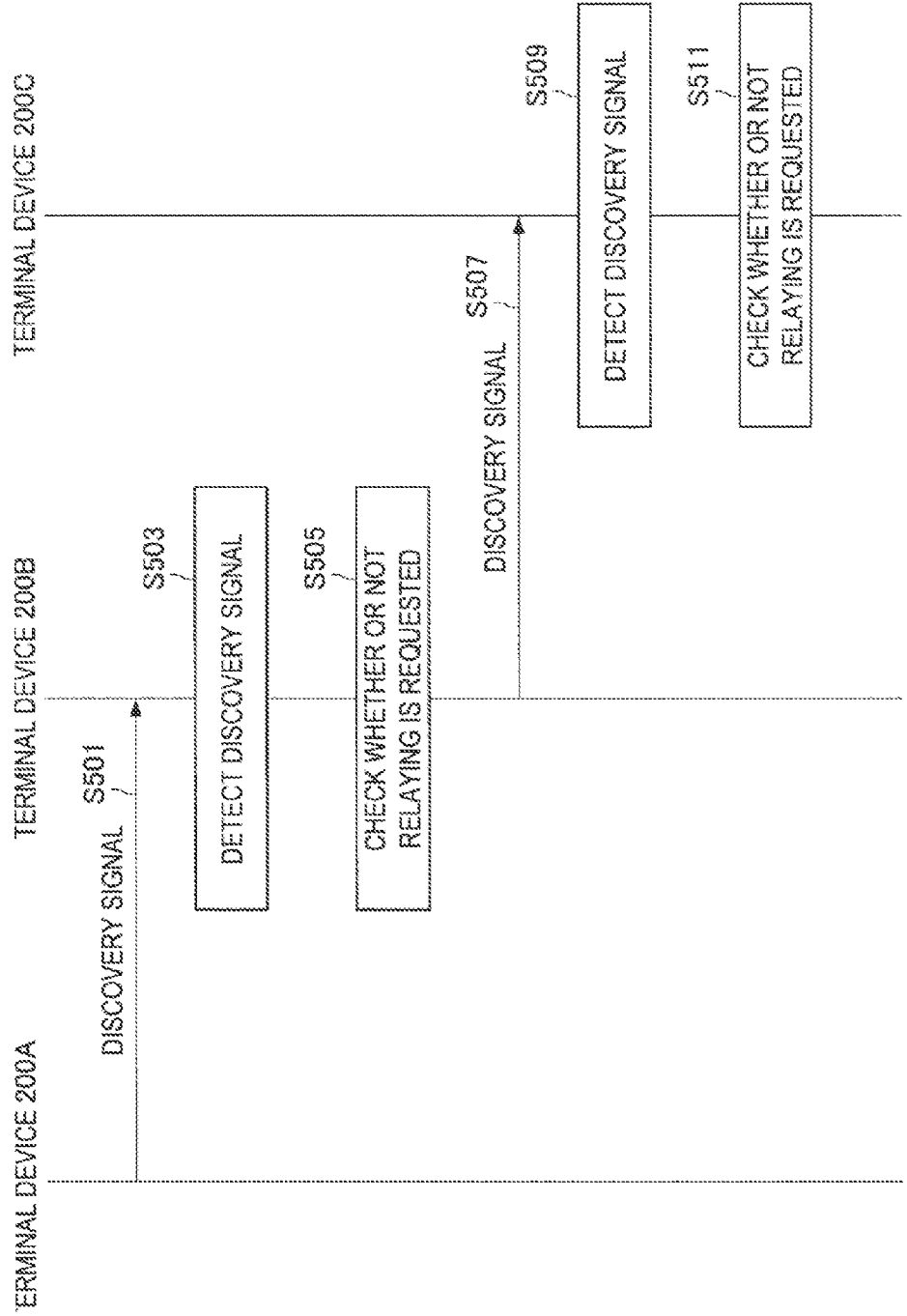
FIG. 16 is a sequence diagram illustrating an example of a diagrammatic flow of a communication control process according to the third embodiment.

FIG. 16 is a sequence diagram illustrating an example of a diagrammatic flow of a communication control process according to the third embodiment.

The terminal device 200A transmits a discovery signal on CCs usable by the terminal device 200A (S501). Each of the CCs is an uplink CC. When transmitting the discovery signal, the terminal device 200A requests relaying of the discovery signal.

Subsequently, the terminal device 200B detects the discovery signal (S503). After that, the terminal device 200B checks whether or not relaying of the discovery signal is requested (S505). As a result, the terminal device 200B confirms that relaying is requested. Subsequently, the terminal device 200B relays the discovery signal on a CC other than the CCs usable by the terminal device 200A (S507).

After that, the terminal device 200C detects the relayed discovery signal (S509). Subsequently, the terminal device 200C checks whether or not relaying of the discovery signal is requested (S511). As a result, the terminal device 200C confirms that relaying is not requested. For this reason, the terminal device 200C does not relay the discovery signal.

(Process Flow Related to Relaying a Discovery Signal)

Figure 17:
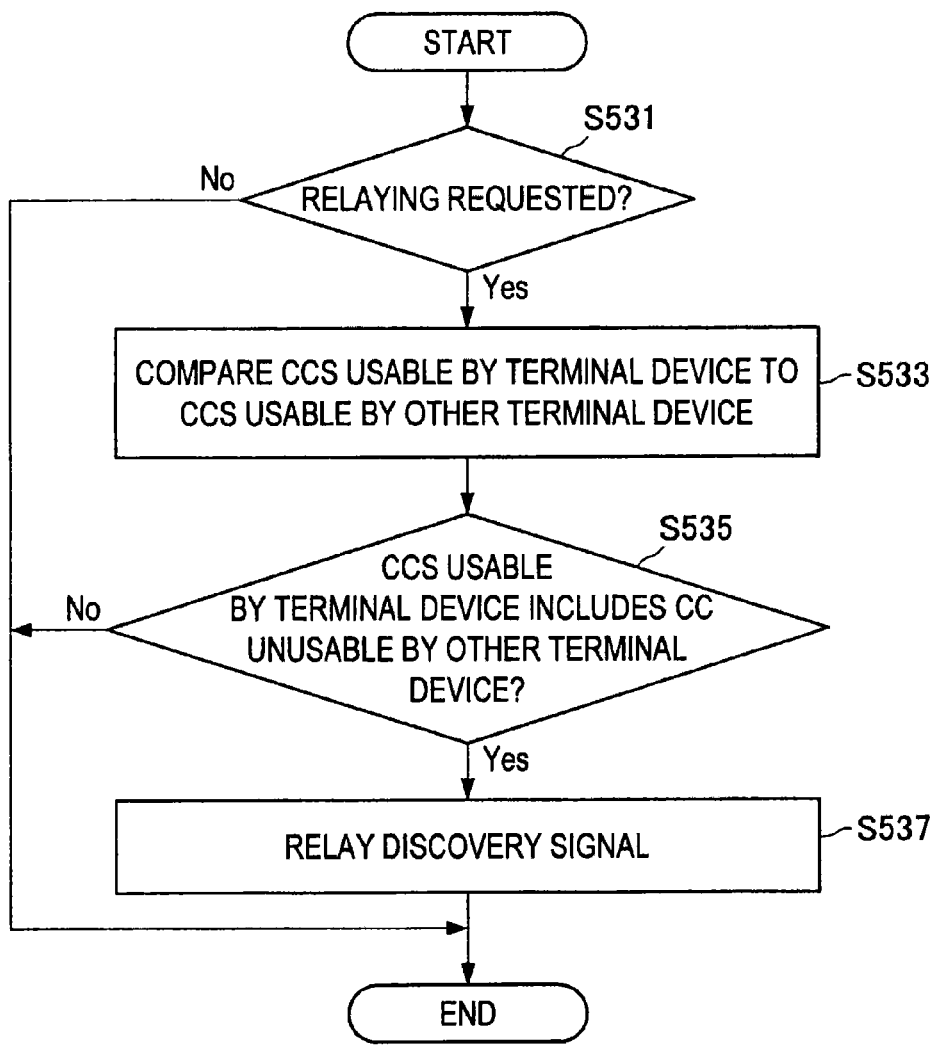
FIG. 17 is a flowchart illustrating an example of a diagrammatic flow of a process related to forwarding a discovery signal according to the third embodiment.

FIG. 17 is a flowchart illustrating an example of a diagrammatic flow of a process related to relaying a discovery signal according to the third embodiment. This process is executed after a discovery signal is detected in the terminal device 200-3.

The communication control unit 283 checks whether or not relaying is requested (S531). If relaying is not requested (S531: No), the process ends.

If relaying is requested (S531: Yes), the communication control unit 283 compares CCs usable by the terminal device 200-3 to CCs usable by the other terminal device 200-3 that transmitted the discovery signal (S533). Subsequently, if a CC unusable by the other terminal device 200-3 does not exist among the CCs usable by the terminal device 200-3 (S535: No), the process ends.

If a CC unusable by the other terminal device 200-3 does exist among the CCs usable by the terminal device 200-3 (S535: Yes), the terminal device 200-3, according to control by the communication control unit 283, relays the discovery signal on a CC unusable by the other terminal device 200-3 (S537). The process then ends.

<<6. Fourth Embodiment>>

Next, a fourth embodiment of the present disclosure will be described with reference to FIGS. 18 to 24.

For example, D2D communication is conducted by using the uplink band of paired bands in frequency-division duplex (FDD). However, if a first terminal device conducting D2D communication freely uses radio resources in that uplink band, a second terminal device conducting D2D communication does not know which radio resource will be used, for example. For this reason, a large load may be imposed on the second terminal device in order to receive a signal from the first terminal device. In addition, if the first terminal device conducting D2D communication freely uses radio resources in that uplink band, interference on radio communication between a base station and a terminal device may occur.

Accordingly, in the fourth embodiment, a base station 100 transmits resource information, which indicates radio resources usable for D2D communication from among the radio resources in the uplink band of FDD paired bands, on the downlink band of the paired bands. In addition, a terminal device 200 controls D2D communication by the terminal device 200 on the basis of the resource information. Consequently, it becomes possible to moderate the load on a device conducting D2D communication, for example.

<6.1. Base Station Configuration>

Figure 18:
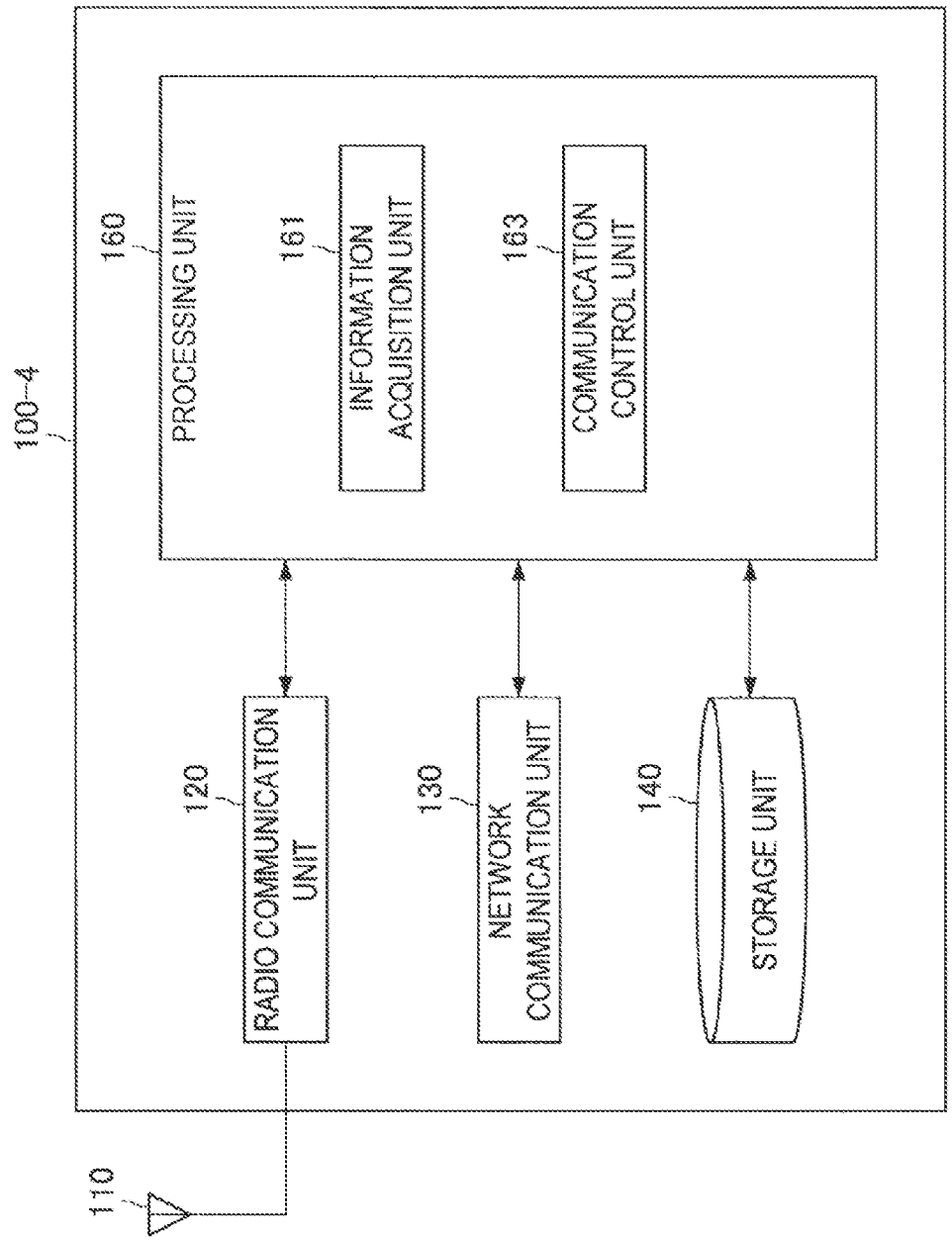
FIG. 18 is a block diagram illustrating an example of a configuration of a base station according to the fourth embodiment.

First, an example of a configuration of a base station 100-4 according to the fourth embodiment will be described with reference to FIGS. 18 to 22. FIG. 18 is a block diagram illustrating an example of a configuration of a base station 100-4 according to the fourth embodiment. Referring to FIG. 18, the base station 100-4 is equipped with an antenna unit 110, a radio communication unit 120, a network communication unit 130, a storage unit 140, and a processing unit 160.

Note that for the description of the antenna unit 110, the radio communication unit 120, the network communication unit 130, and the storage unit 140, there is no difference between the first embodiment and the fourth embodiment. Thus, at this point, only the information acquisition unit 161 and the communication control unit 163 included in the processing unit 160 will be described.

(Information Acquisition Unit 161)

The information acquisition unit 161 acquires information for the purpose of control by the communication control unit 163.

Particularly, in the fourth embodiment, the information acquisition unit 161 acquires resource information that indicates radio resources usable for D2D communication from among the radio resources in the uplink band of FDD paired bands.

Specific Radio Frame/Specific Subframe

For example, the radio resources are the radio resources of specific radio frames and/or specific subframes, and the resource information indicates the specific radio frames and/or the specific subframes.

Specifically, the radio resources of specific radio frames and/or specific subframes is reserved for D2D communication as a resource pool. Hereinafter, specific examples regarding this point will be described with reference to FIGS. 19 to 21.

Figure 19:
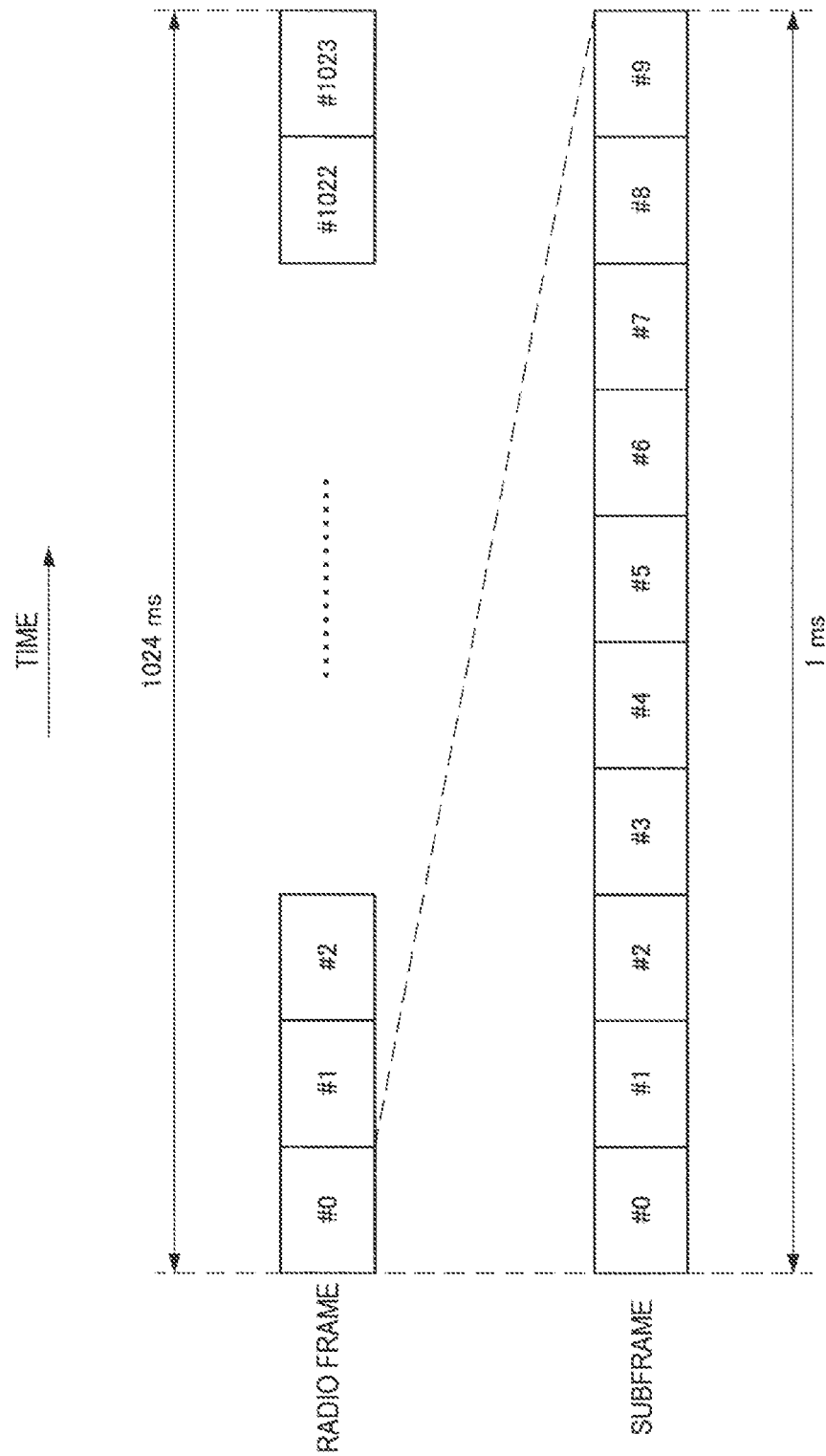
FIG. 19 is an explanatory diagram for illustrating radio frames and subframes.

FIG. 19 is an explanatory diagram for illustrating radio frames and subframes. Referring to FIG. 19, 1024 radio frames having an SFN from 0 to 1023 are illustrated. Such 1024 radio frames having an SFN from 0 to 1023 are repeated. Also, each radio frame includes 10 subframes having a subframe number from 0 to 9.

Figure 20:
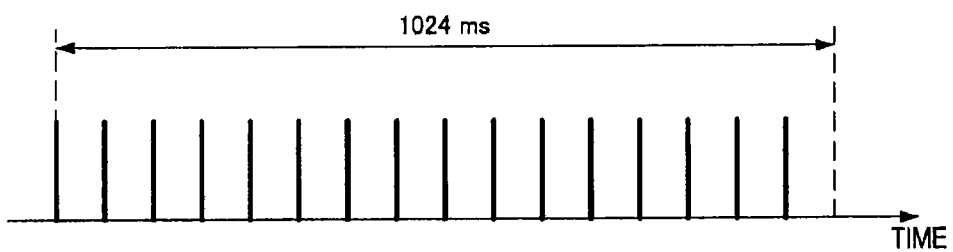
FIG. 20 is an explanatory diagram for illustrating a first example of a resource pool.
Figure 21:
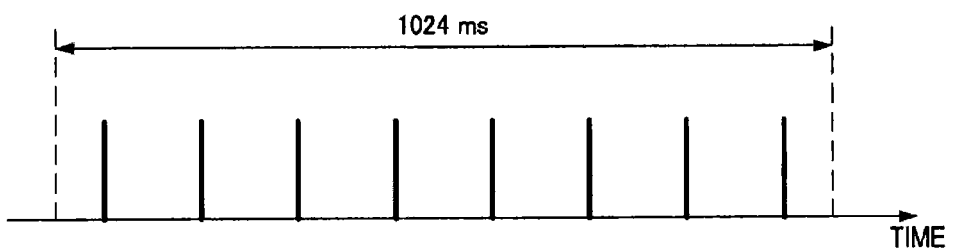
FIG. 21 is an explanatory diagram for illustrating a second example of a resource pool.

FIGS. 20 and 21 are explanatory diagrams for illustrating examples of a resource pool. Referring to FIGS. 20 and 21, a period of 1024 milliseconds (that is, 10.24 seconds) during which 1024 radio frames arrive is illustrated. For example, in the example of FIG. 20, the radio resources of 16 radio frames from among the 1024 radio frames are reserved for D2D communication as a resource pool. In other words, one radio frame per cycle of 64 radio frames is reserved for D2D communication. For example, in the example of FIG. 21, the radio resources of 8 radio frames from among the 1024 radio frames are reserved for D2D communication as a resource pool. In other words, one radio frame per cycle of 128 radio frames is reserved for D2D communication. As an example, the resource information indicates the SFNs of the specific radio frames with a combination of a cycle (that is, a recursion period) and an offset.

Note that both the resource pool illustrated in FIG. 20 and the resource pool illustrated in FIG. 21 may be reserved for D2D communication. In this case, the resource information may indicate the SFNs of the specific radio frames with two combinations of a cycle and an offset. More generally, the resource information may indicate the SFNs of the specific radio frames with two or more combinations of a cycle and an offset.

In addition, the resource information may also the subframe numbers of specific subframes, or alternatively, an allocation of specific subframes.

Specific Bands

The radio resources may also be radio resources in specific bands of the uplink band, and the resource information may indicate the specific bands.

Specific Resource Blocks

The radio resources may also be specific resource blocks, and the resource information may indicate the specific resource blocks.

(Communication Control Unit 163)

The communication control unit 163 conducts control related to radio communication.

Particularly, in the fourth embodiment, the communication control unit 163 controls the transmission of the resource information on the downlink band of the paired bands. In other words, according to control by the communication control unit 163, the base station 100-4 transmits the resource information on the downlink band of the paired bands. Hereinafter, a specific example regarding this point will be described with reference to FIG. 22.

Figure 22:
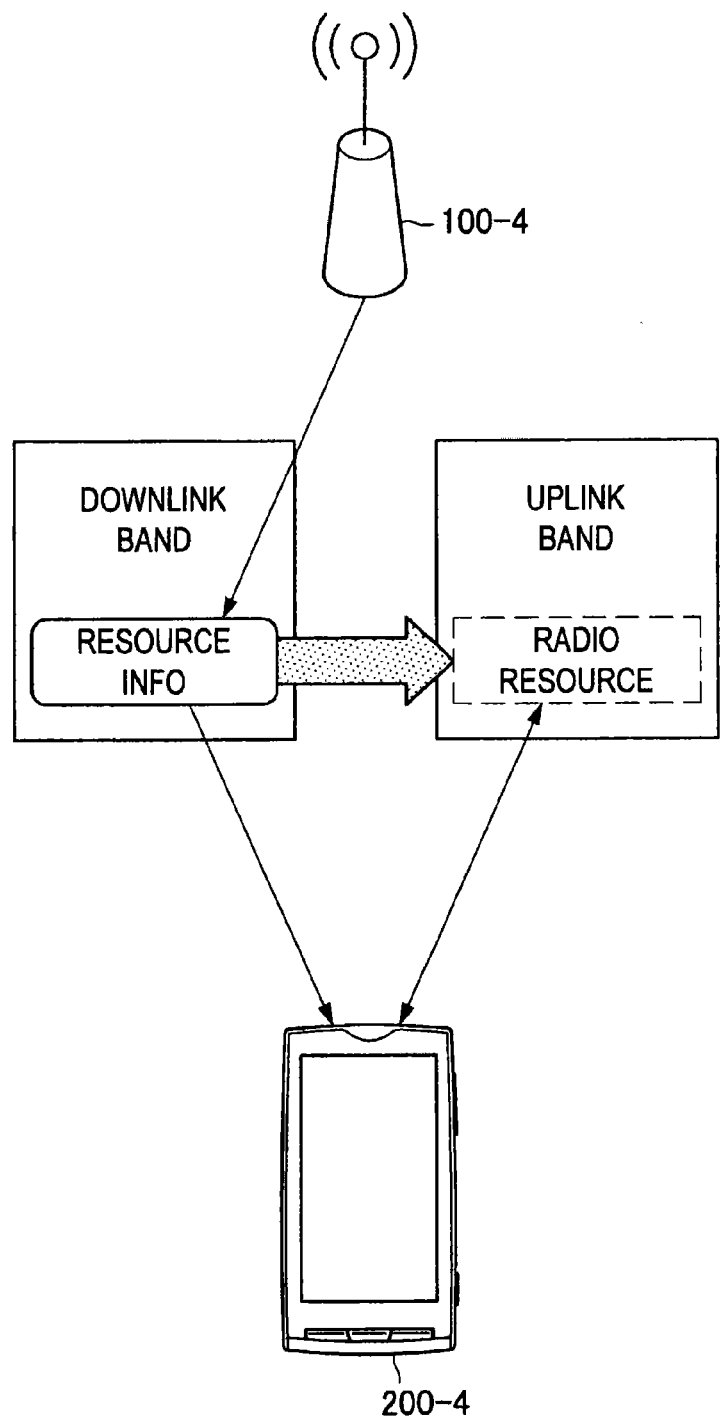
FIG. 22 is an explanatory diagram for illustrating an example of transmitting resource information.

FIG. 22 is an explanatory diagram for illustrating an example of transmitting resource information. Referring to FIG. 22, a base station 100-4 and a terminal device 200-4 are illustrated. In addition, a downlink band an uplink band forming FDD paired bands are illustrated. The base station 100-4 transmits on the downlink band resource information that indicates radio resources usable for D2D communication from among the radio resources in the uplink band. Subsequently, the terminal device 200-4 receives the resource information on the downlink band, and uses the resource information for D2D communication, for example.

Consequently, it becomes possible to moderate the load on a device conducting D2D communication, for example.

First Technique (System Information)

As a first example, the communication control unit 163 controls the transmission of system information that includes the resource information on the downlink band. In other words, the resource information is information included in system information, and according to control by the communication control unit 163, the base station 100-4 transmits the system information including the resource information on the downlink band.

As a specific process, the communication control unit 163 may, for example, map a signal of system information including the resource information onto a radio resource allocated to that system information from among the radio resources in the downlink band. As a result, the resource information is transmitted as part of the system information.

Consequently, even if, for example, the terminal device 200-4 is in an idle state (for example, RRC Idle), the terminal device 200-4 becomes able to learn radio resources usable for D2D communication. For this reason, it is possible to moderate not only the load on a terminal device 200-4 in a connected state (for example, RRC Connected), but also the load on a terminal device 200-4 in an idle state.

Also, by transmitting the system information including the resource information, even if a large number of terminal devices 200-4 are present inside the cell 10, the resource information is transmitted all together to that large number of terminal devices 200-4. For this reason, increases in overhead due to the number of terminal devices 200-4 may be avoided.

Second Technique (Signaling)

As a second example, the communication control unit 163 controls the transmission of the resource information by signaling an individual terminal device on the downlink band. In other words, according to control by the communication control unit 163, the base station 100-4 may transmit the resource information by signaling to an individual terminal device 200-4 on the downlink band.

As a specific process, the communication control unit 163 may, for example, map a signal of the resource information onto a radio resource for signaling an individual terminal device 200-4 from among the radio resources in the downlink band. As a result, the resource information is transmitted by signaling an individual terminal device 200-4.

Consequently, system information is not used to transmit the resource information, for example. For this reason, the consumption of precious radio resources for system information may be avoided.

Also, by transmitting the resource information by signaling, it becomes possible to moderate the load on a terminal device not conducting D2D communication, for example. More specifically, in the case in which the resource information is included in system information, if the resource information changes (that is, if the radio resource usable for D2D communication changes), even a terminal device not conducting D2D communication will check the system information. For this reason, in the case in which the resource information is included in system information, the load on a terminal device not conducting D2D communication may increase. However, by transmitting the resource information by signaling, such a load is not produced. Thus, the load on a terminal device not conducting D2D communication may be moderated.

<6.2. Terminal Device Configuration>

Figure 23:
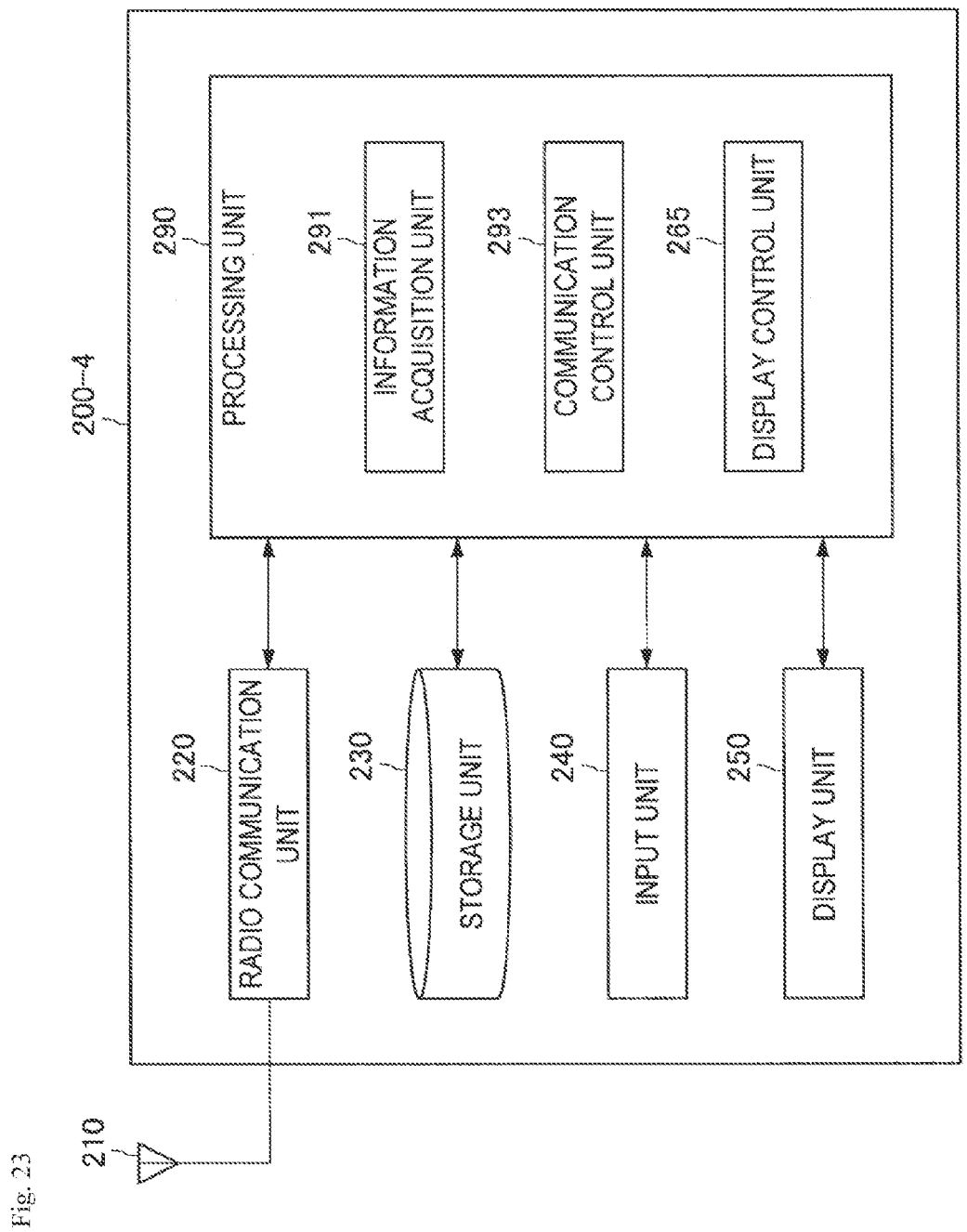
FIG. 23 is a block diagram illustrating an example of a configuration of a terminal device according to the fourth embodiment.

Next, an example of a configuration of a terminal device 200-4 according to the fourth embodiment will be described with reference to FIG. 23. FIG. 23 is a block diagram illustrating an example of a configuration of a terminal device 200-4 according to the fourth embodiment. Referring to FIG. 23, the terminal device 200-4 is equipped with an antenna unit 210, a radio communication unit 220, a storage unit 230, an input unit 240, a display unit 250, and a processing unit 290.

Note that for the antenna unit 210, the radio communication unit 220, the storage unit 240, the input unit 240, the display unit 250, and the display control unit 265, there is no difference between the first embodiment and the fourth embodiment. Thus, at this point, only the information acquisition unit 291 and the communication control unit 293 included in the processing unit 290 will be described.

(Information Acquisition Unit 291)

The information acquisition unit 291 acquires information for the purpose of control by the communication control unit 293.

Particularly, in the fourth embodiment, the information acquisition unit 291 acquires the resource information. As discussed earlier, the resource information is information that indicates radio resources usable for D2D communication from among the radio resources in the uplink band of FDD paired bands.

For example, if the resource information is transmitted by the base station 100-4 on the downlink band of the paired bands, the information acquisition unit 291 acquires the resource information via the radio communication unit 220.

(Communication Control Unit 293)

The communication control unit 293 conducts control related to radio communication by the terminal device 200-4.

Particularly, in the fourth embodiment, the communication control unit 293 controls D2D communication by the terminal device 200-4 on the uplink band, on the basis of the resource information.

For example, the communication control unit 293 controls D2D communication by the terminal device 200-4 so that the terminal device 200-4 transmits a signal related to D2D communication (hereinafter called a "D2D-related signal") using a radio resource indicated by the resource information.

As a specific process, the communication control unit 293 may, for example, map a D2D-related signal onto the radio resource. As a result, the terminal device 200-4 transmits the D2D-related signal using the radio resource.

As another example, the communication control unit 293 controls D2D communication by the terminal device 200-4 so that the terminal device 200-4 receives a D2D-related signal from another terminal device 200-4 using a radio resource indicated by the resource information (a radio resource in the uplink band). As a specific process, the communication control unit 293 may, for example, conduct receiving processes (such as demodulation and decoding, for example) on a signal transmitted using the radio resource (a radio resource in the uplink band).

Note that the D2D-related signal includes a D2D communication signal, for example. More specifically, the D2D-related signal includes a D2D communication data signal and/or control signal, for example.

For example, the D2D-related signal includes a signal for starting D2D communication. More specifically, the D2D-related signal may include a signal such as, for example, a signal for the purpose of synchronization (for example, a synchronization signal), a signal for the purpose of discovery (for example, a discovery signal), and/or a control signal for the purpose of connection establishment (for example, a signal of a message in a connection establishment procedure).

<6.3. Process Flow>

Figure 24:
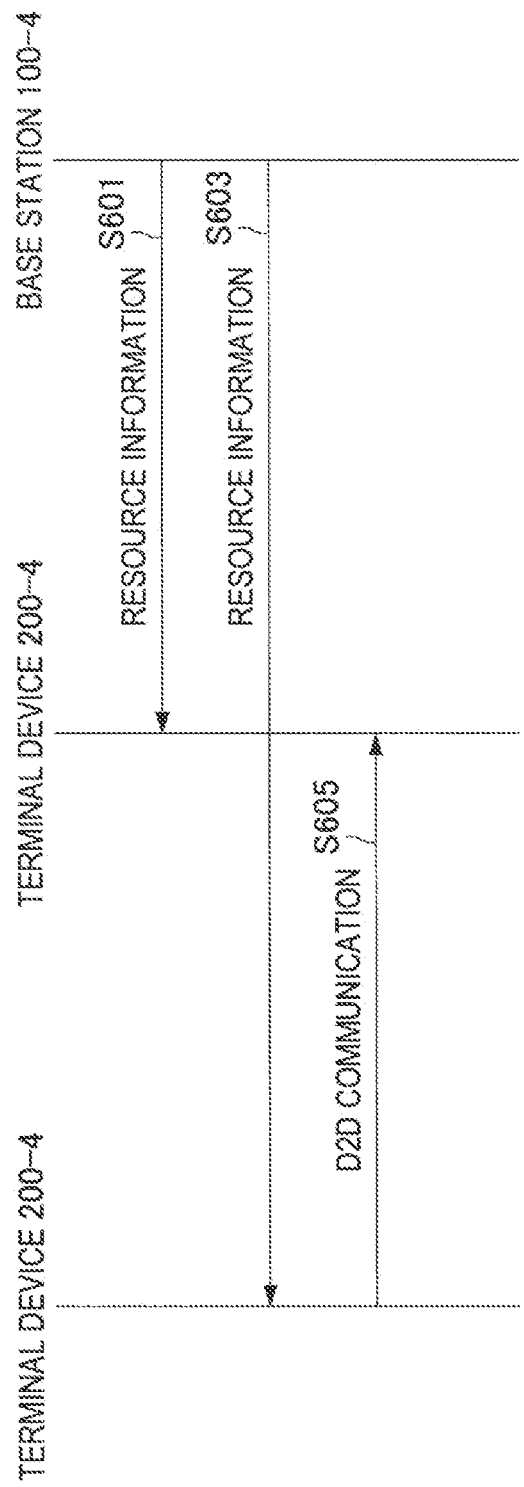
FIG. 24 is a sequence diagram illustrating an example of a diagrammatic flow of a communication control process according to the fourth embodiment.

Next, an example of a communication control process according to the fourth embodiment will be described with reference to FIG. 24. FIG. 24 is a sequence diagram illustrating an example of a diagrammatic flow of a communication control process according to the fourth embodiment.

The base station 100-4 transmits to terminal devices 200-4 resource information, which indicates radio resources usable for D2D communication from among the radio resources in the uplink band of FDD paired bands, on the downlink band of the paired bands (S601, S603). For example, the base station 100-4 transmits system information that includes the resource information on the downlink band.

After that, the terminal devices 200-4 conduct D2D communication using the radio resources indicated by the resource information (S605). In other words, the terminal devices 200-4 use the radio resources to transmit and receive D2D communication signals (for example, data signals and/or control signals). Note that, before the terminal devices 200-4 conduct the D2D communication using the radio resources, the terminal devices 200-4 may transmit and receive signals for starting D2D communication (such as a synchronization signal, a discovery signal, and a control signal for connection establishment, for example).

<<7. Applications>>

Technology according to the present disclosure is applicable to various products. For example, the base station 100 may be realized as an evolved Node B (eNB) of any type, such as a macro eNB or a small eNB. A small eNB may be an eNB that covers a cell smaller than a macro cell, such as a pico eNB, micro eNB, or home (femto) eNB. Conversely, the base station 100 may also be realized as another type of base station, such as a NodeB or a base transceiver station (BTS). The base station 100 may also include a main unit that controls radio communication (also called a base station device), and one or more remote radio heads (RRHs) placed in a location separate from the main unit. Additionally, various types of terminals to be discussed later may also operate as the base station 100 by temporarily or semi-permanently executing a base station function.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, the terminal device 200 may be a radio communication module mounted onboard these terminals (for example, an integrated circuit module configured on a single die).

<7.1. Applications Related to Base Station>

(First Application)

Figure 25:
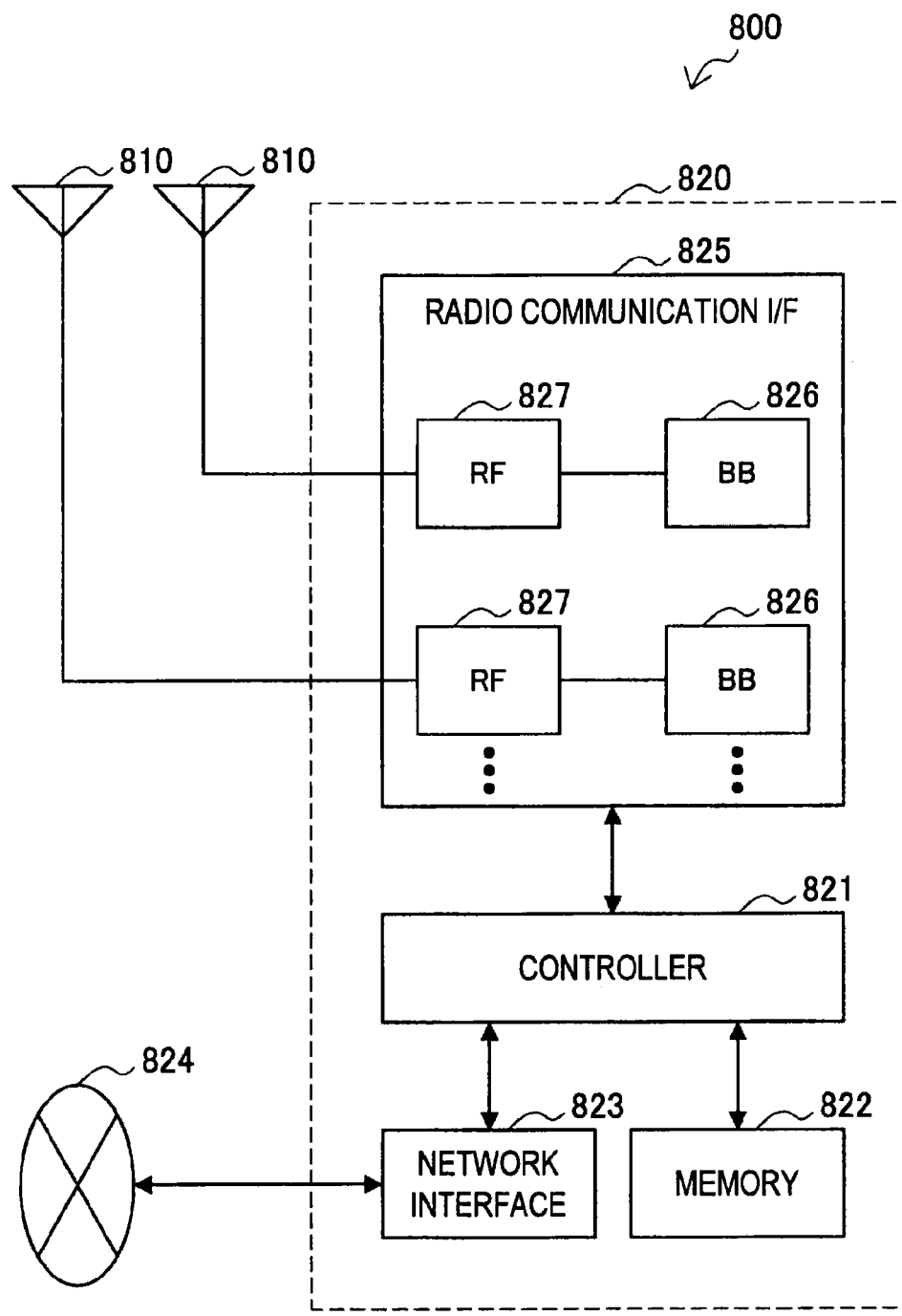
FIG. 25 is a block diagram illustrating a first example of a schematic configuration of an eNB to which technology according to an embodiment of the present disclosure may be applied.

FIG. 25 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNB 800 may include multiple antennas 810 as illustrated in FIG. 25, and the multiple antennas 810 may respectively correspond to multiple frequency bands used by the eNB 800, for example. Note that although FIG. 25 illustrates an example of the eNB 800 including multiple antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include multiple BB processors 826 as illustrated in FIG. 25, and the multiple BB processors 826 may respectively correspond to multiple frequency bands used by the eNB 800, for example. In addition, the radio communication interface 825 may also include multiple RF circuits 827 as illustrated in FIG. 25, and the multiple RF circuits 827 may respectively correspond to multiple antenna elements, for example. Note that although FIG. 25 illustrates an example of the radio communication interface 825 including multiple BB processors 826 and multiple RF circuits 827, the radio communication interface 825 may also include a single BB processor 826 or a single RF circuit 827.

(Second Application)

Figure 26:
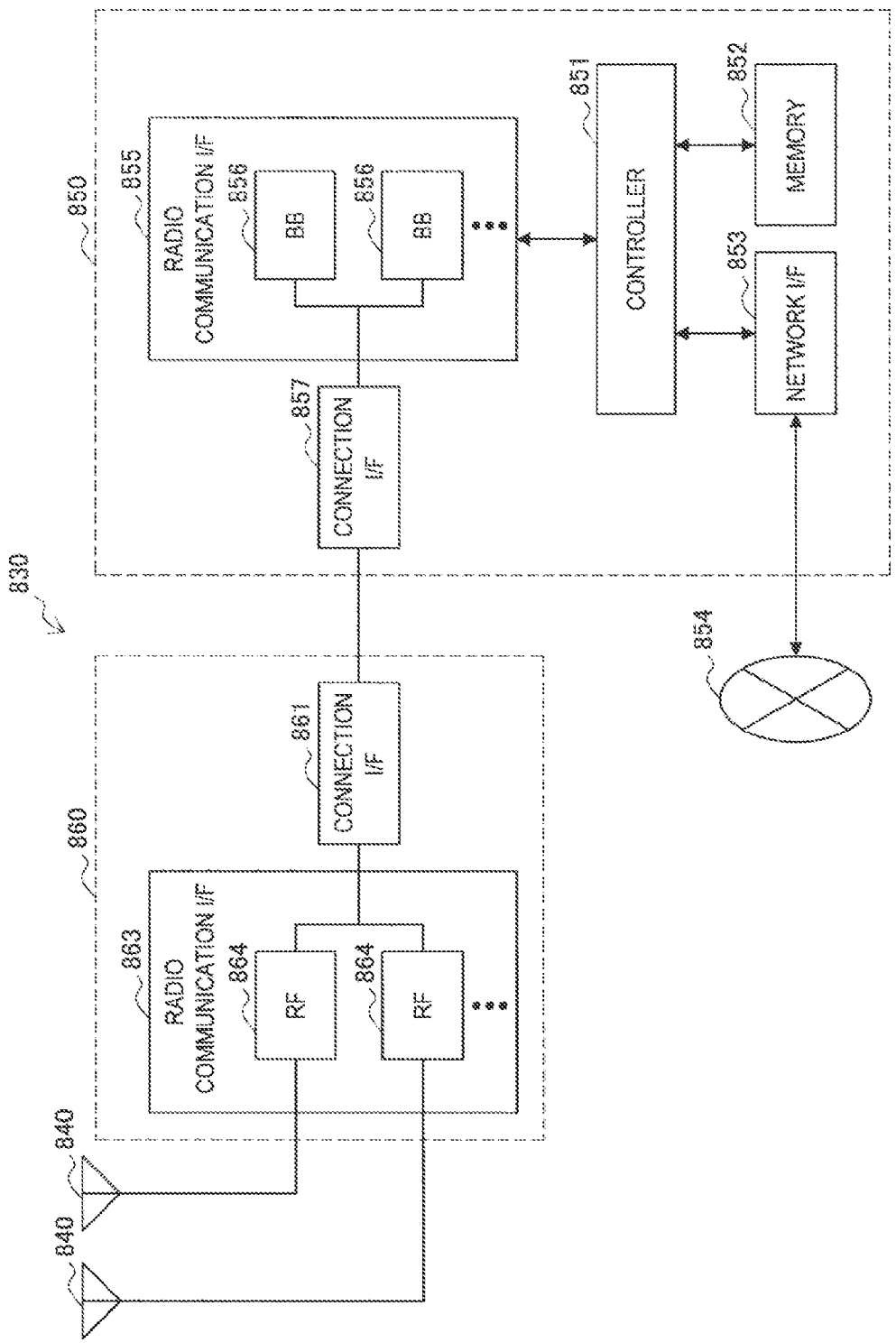
FIG. 26 is a block diagram illustrating a second example of a schematic configuration of an eNB to which technology according to an embodiment of the present disclosure may be applied.

FIG. 26 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNB 830 may include multiple antennas 840 as illustrated in FIG. 26, and the multiple antennas 840 may respectively correspond to multiple frequency bands used by the eNB 830, for example. Note that although FIG. 26 illustrates an example of the eNB 830 including multiple antennas 840, the eNB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 25.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 25, except for being connected to an RF circuit 864 of the RRH 860 via the connection interface 857. The radio communication interface 855 may also include multiple BB processors 856 as illustrated in FIG. 26, and the multiple BB processors 856 may respectively correspond to multiple frequency bands used by the eNB 830, for example. Note that although FIG. 26 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include multiple RF circuits 864 as illustrated in FIG. 26, and the multiple RF circuits 864 may respectively correspond to multiple antenna elements, for example. Note that although FIG. 26 illustrates an example of the radio communication interface 863 including multiple RF circuits 864, the radio communication interface 863 may also include a single RF circuit 864.

In the eNB 800 and the eNB 830 illustrated in FIGS. 25 and 26, the information acquisition unit 151 and communication control unit 153 described with reference to FIG. 3 as well as the information acquisition unit 161 and communication control unit 163 described with reference to FIG. 18 may be implemented in the radio communication interface 825 as well as the radio communication interface 855 and/or the radio communication interface 863. Also, at least some of these functions may also be implemented in the controller 821 and the controller 851.

<7.2. Applications Related to Terminal Device>
(First Application)

Figure 27:
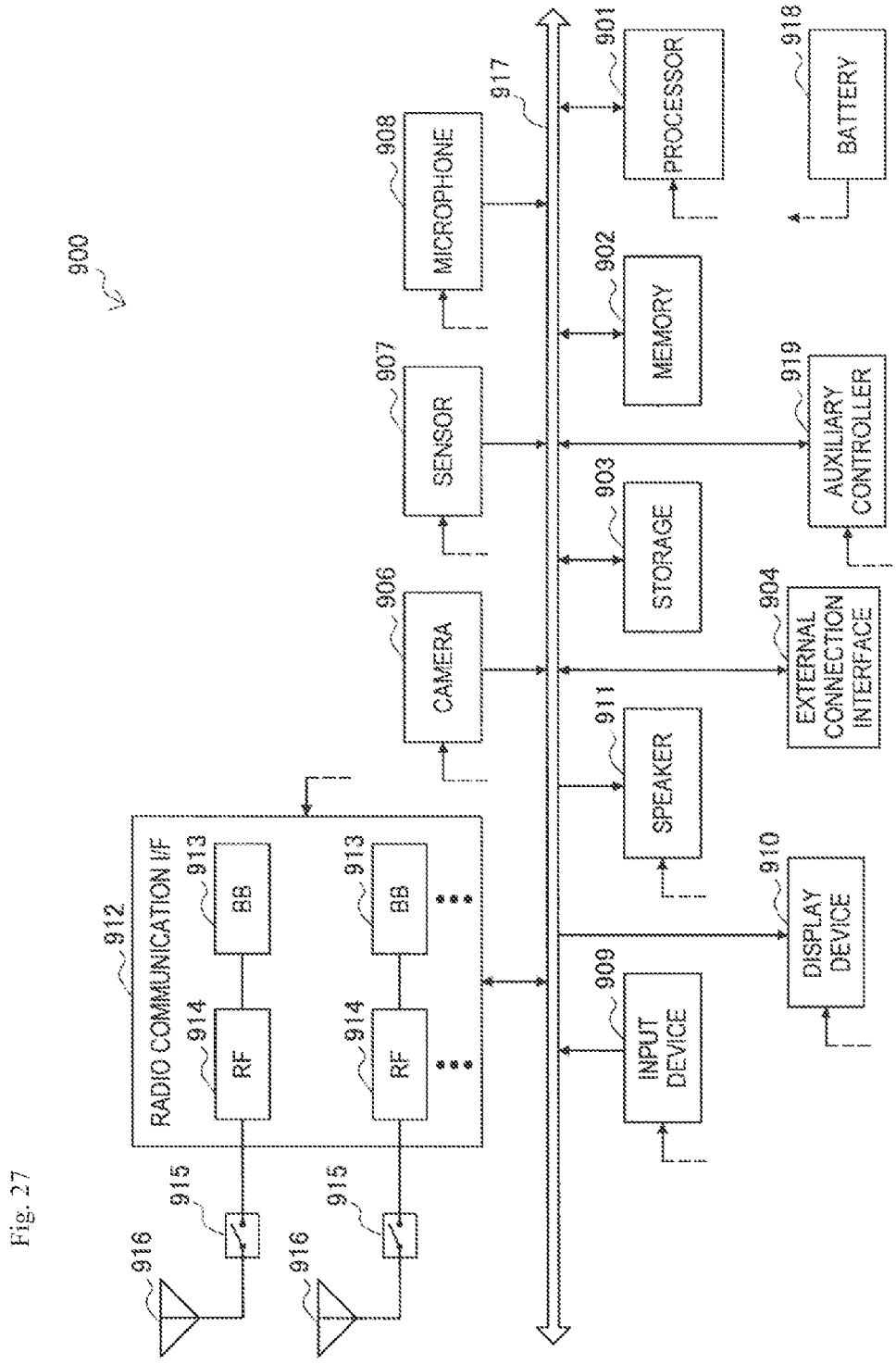
FIG. 27 is a block diagram illustrating an example of a schematic configuration of a smartphone to which technology according to an embodiment of the present disclosure may be applied.

FIG. 27 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 27. Note that although FIG. 27 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 27. Note that although FIG. 27 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 27 via power supply lines partially illustrated with dashed lines in the drawing. The auxiliary controller 919 causes minimal functions of the smartphone 900 to operate while in a sleep mode, for example.

In the smartphone 900 illustrated in FIG. 27, the information acquisition unit 261 and the communication control unit 263 described with reference to FIG. 6, the information acquisition unit 271 and the communication control unit 273 described with reference to FIG. 11, the information acquisition unit 281 and the communication control unit 283 described with reference to FIG. 14, as well as the information acquisition unit 291 and the communication control unit 293 described with reference to FIG. 23 may be implemented in the radio communication interface 912. Also, at least some of these functions may also be implemented in the processor 901 or the auxiliary controller 919.

(Second Application)

Figure 28:
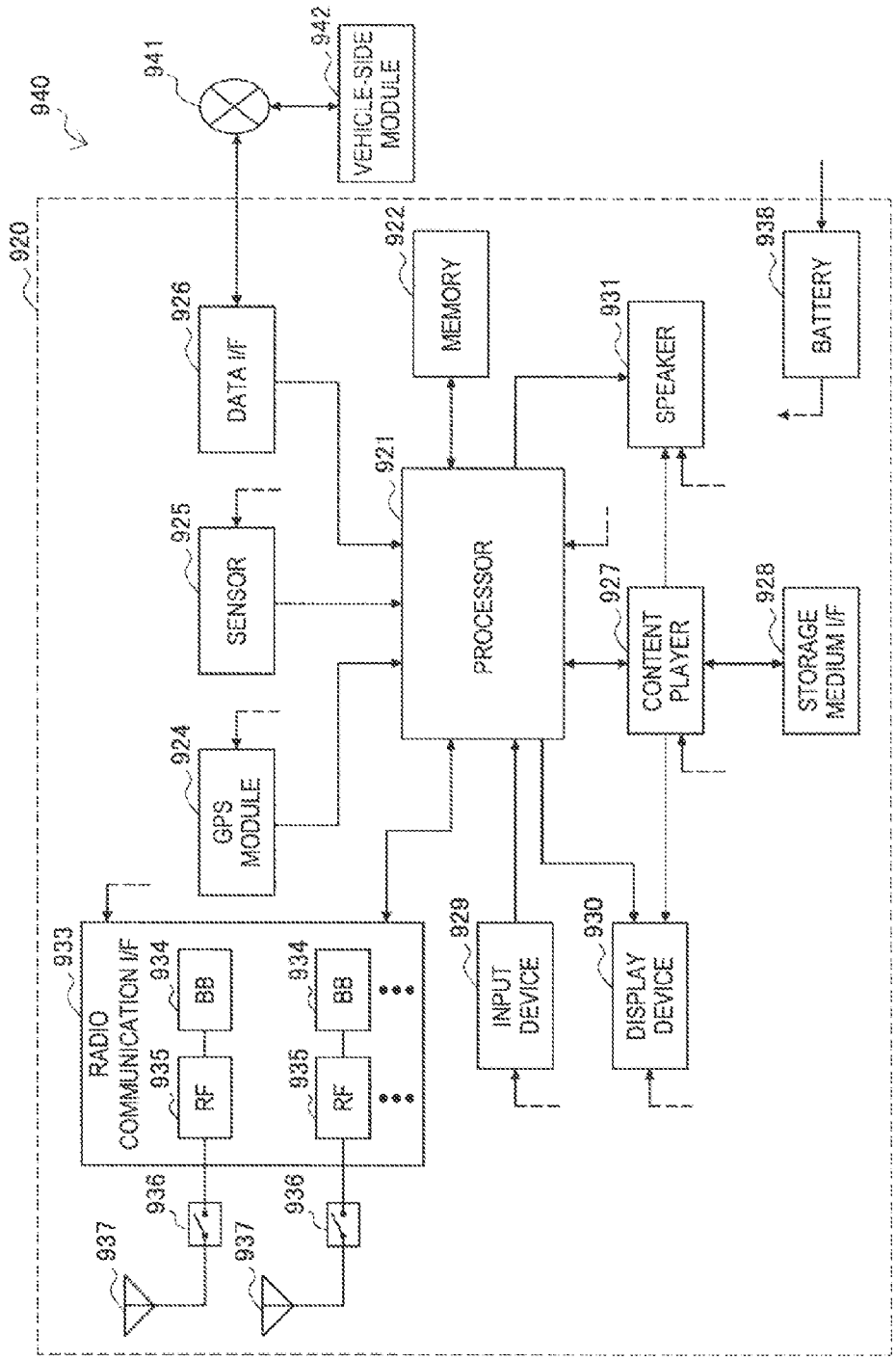
FIG. 28 is a block diagram illustrating an example of a schematic configuration of a car navigation device to which technology according to an embodiment of the present disclosure may be applied.

FIG. 28 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 28. Note that although FIG. 28 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 28. Note that although FIG. 28 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 28 via power supply lines partially illustrated with dashed lines in the drawing. Also, the battery 938 stores electric power supplied from the vehicle.

In the car navigation device 920 illustrated in FIG. 28, the information acquisition unit 261 and the communication control unit 263 described with reference to FIG. 6, the information acquisition unit 271 and the communication control unit 273 described with reference to FIG. 11, the information acquisition unit 281 and the communication control unit 283 described with reference to FIG. 14, as well as the information acquisition unit 291 and the communication control unit 293 described with reference to FIG. 23 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

<<8. Conclusion>>

The foregoing thus describes respective devices and respective processes according to an embodiment of the present disclosure with reference to FIGS. 1 to 28.

(First Embodiment)

Base Station

According to the first embodiment, in the base station 100-1, the information acquisition unit 151 acquires carrier information indicating a CC for transmitting a discovery signal, which enables another device to discover a device conducting D2D communication, from among multiple CCs used for carrier aggregation. Additionally, the communication control unit 153 controls the transmission of the carrier information to the terminal device 200-1.

Consequently, it becomes possible to moderate the load on a terminal device 200-1 conducting D2D communication. Specifically, the load on the terminal device 200 for detecting a discovery signal may be moderated, and in addition, the load on the terminal device 200 for transmitting a discovery signal may also be moderated.

For example, with the carrier information, the terminal device 200-1 becomes able to learn which CC a discovery signal is transmitted on. For this reason, it is sufficient for the terminal device 200-1 to conduct a detection process for detecting a discovery signal on a signal transmitted on the CC on which the discovery signal is transmitted, without conducting the detection process on signals transmitted on other CCs. In other words, it is sufficient for the terminal device 200-1 to conduct the detection process on a limited CC. For this reason, the load on the terminal device 200-1 for detecting a discovery signal may be moderated.

As another example, the terminal device 200-1 that transmits a discovery signal does not need to transmit a discovery signal on all CCs for quick and easy detection of a discovery signal by another terminal device 200-1. In other words, the terminal device 200-1 may transmit a discovery signal on a limited CC. For this reason, the load on the terminal device 200-1 for transmitting a discovery signal may be moderated.

As another example, the multiple CCs include one or more downlink CCs and one or more uplink CCs, and the component carrier for transmitting the discovery signal is one of the one or more uplink component carriers.

Consequently, avoiding interference on communication between the base station 100-1 and a terminal device 200-1 becomes easier. This is because on the uplink, a signal may not be transmitted unless resources are allocated to a terminal device 200-1.

As a first technique, the communication control unit 153 controls the transmission of system information that includes the carrier information, for example.

Consequently, even if, for example, the terminal device 200-1 is in an idle state (for example, Radio Resource Control Idle (RRC Idle)), the terminal device 200-1 becomes able to learn the CC on which a discovery signal is transmitted. For this reason, it is possible to moderate not only the load on a terminal device 200-1 in a connected state (for example, Radio Resource Control Connected (RRC Connected)), but also the load on a terminal device 200-1 in an idle state.

Also, by transmitting the system information including the carrier information, even if a large number of terminal devices 200-1 are present inside the cell 10, the carrier information is transmitted all together to that large number of terminal devices 200-1. For this reason, increases in overhead due to the number of terminal devices 200-1 may be avoided.

Furthermore, the communication control unit 153 controls the transmission of the system information so that the system information is transmitted on each CC that carries a downlink signal from among the multiple CCs, for example.

Consequently, the terminal device 200-1 becomes able to acquire the system information including the carrier information and learn the CC that carries a discovery signal, irrespective of which CC carrying a downlink signal is used by that terminal device 200-1.

As a second technique, the communication control unit 153 may also control the transmission of carrier information by signaling to an individual terminal device 200-1.

Consequently, system information is not used to transmit the carrier information, for example. For this reason, the consumption of precious radio resources for system information may be avoided.

Also, by transmitting the carrier information by signaling, it becomes possible to moderate the load on a terminal device not conducting D2D communication, for example. More specifically, in the case in which the carrier information is included in system information, if the carrier information changes (that is, if the CC that carries a discovery signal changes), even a terminal device not conducting D2D communication will check the system information. For this reason, in the case in which the carrier information is included in system information, the load on a terminal device not conducting D2D communication may increase. However, by transmitting the carrier information by signaling, such a load is not produced. Thus, the load on a terminal device not conducting D2D communication may be moderated.

Furthermore, the carrier information transmitted by signaling an individual terminal device 200-1 may also indicate a CC used to transmit a discovery signal by a terminal device 200-1 positioned nearby the individual terminal device 200-1.

Consequently, it is sufficient for a terminal device 200-1 detecting a discovery signal to conduct a detection process for detecting a discovery signal on a signal transmitted on a CC used to transmit a discovery signal by a terminal device 200-1 positioned nearby, for example. For this reason, the load on the terminal device 200-1 for detecting a discovery signal is further moderated.

Terminal Device (the Case of Detecting a Discovery Signal)

According to the first embodiment, in a terminal device 200-1 that detects a discovery signal, the information acquisition unit 261 acquires carrier information indicating a CC for transmitting a discovery signal from among multiple CCs used for carrier aggregation. Additionally, the communication control unit 263 controls a detection process for detecting a discovery signal on the basis of the carrier information.

Terminal Device (the Case of Transmitting a Discovery Signal)

According to the first embodiment, for example, in a terminal device 200-1 that transmits a discovery signal, the information acquisition unit 261 acquires individual carrier information indicating a CC used by the terminal device 200-1 to transmit a discovery signal from among multiple CCs used for carrier aggregation, for example. Additionally, the communication control unit 263 controls the transmission of the individual carrier information to the base station 100-1.

Meanwhile, according to a modification of the first embodiment, the information acquisition unit 261 acquires carrier information indicating a CC for transmitting a discovery signal from among multiple CCs used for carrier aggregation. Additionally, the communication control unit 263 controls the transmission of a discovery signal on the basis of the carrier information.

(Second Embodiment)

Terminal Device (the Case of Transmitting a Discovery Signal)

According to the second embodiment, the information acquisition unit 271 acquires information related to each of multiple CCs used for carrier aggregation. Additionally, the communication control unit 273 controls the transmission of the discovery signal so that the discovery signal is transmitted on each of the multiple CCs.

Consequently, it becomes possible to moderate the load on a terminal device 200 conducting D2D communication. Specifically, it becomes possible to detect a discovery signal on each of multiple CCs, for example. For this reason, it is sufficient to conduct a detection process for detecting a discovery signal on a signal transmitted on any one of the CCs, without conducting the detection process on signals transmitted on the other CCs. Thus, the load on the terminal device 200-2 for detecting a discovery signal is moderated.

Also, each of the multiple CCs is an uplink CC, for example.

Consequently, avoiding interference on communication between the base station 100-2 and the terminal device 200-2 becomes easier. This is because on the uplink, a signal may not be transmitted unless resources are allocated to the terminal device 200-2.

Terminal Device (the Case of Detecting a Discovery Signal)

According to the second embodiment, in a terminal device 200-1 that detects a discovery signal, the information acquisition unit 271 acquires information related to one CC from among multiple CCs used for carrier aggregation. The communication control unit 273 controls a detection process for detecting a discovery signal so that the detection process is conducted on a signal transmitted on the one CC from among the multiple CCs.

Consequently, the load on a terminal device 200-2 for detecting a discovery signal may be moderated, for example.

Also, the one CC is a PCC for the terminal device 200-2, for example. Also, the one CC is an uplink CC, for example.

(Third Embodiment)

Terminal Device (the Case of Detecting a Discovery Signal)

According to the third embodiment in accordance with the present disclosure, after detecting a discovery signal transmitted by another terminal device 200-3, the communication control unit 283 controls the transmission of a discovery signal so that a discovery signal is relayed on a CC that does not carry a discovery signal transmitted by the other terminal device 200-3 from among the multiple CCs.

Consequently, it becomes possible to transmit a discovery signal on more CCs, for example. Such relaying is particularly effective in the case in which the meaning to be reported is immediately identifiable by detecting a discovery signal, for example. Such relaying is also particularly effective in the case in which D2D communication is used for public safety, for example, since fast reporting is demanded.

Also, in the case in which the discovery signal transmitted by the other terminal device 200-3 is a discovery signal relayed by the other terminal device 200-3, for example, the communication control unit 283 controls the transmission of the discovery signal so that the discovery signal is not relayed further.

Consequently, it becomes possible to avoid repeated relaying, for example.

The foregoing thus describes preferred embodiments of the present disclosure with reference to the attached drawings. However, the present disclosure obviously is not limited to such examples. It is clear to persons skilled in the art that various modifications or alterations may occur insofar as they are within the scope stated in the claims, and it is to be understood that such modifications or alterations obviously belong to the technical scope of the present disclosure.

For example, an example is described in which FDD is adopted as the duplexing scheme, but the present disclosure is not limited to such an example. For example, time-division duplex (TDD) may also be adopted as the duplexing scheme. In this case, both downlink signals and uplink signals are transmitted on each of the multiple CCs used for carrier aggregation. Additionally, in the frequency direction, a discovery signal may be transmitted on any of the multiple CCs, for example. Also, in the time direction, a discovery signal is transmitted in an uplink subframe, and not transmitted in a downlink subframe, for example.

Additionally, an example is described in which a detection process for detecting a discovery signal is itself controlled, but the present disclosure is not limited to such an example. For example, the detection process may also be controlled by controlling an entire receiving process that includes the detection process.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (for example, a base station device included in a base station) or a terminal device to exhibit functions similar to each structural element of the foregoing communication control device or terminal device. Also, a storage medium having such a computer program stored therein may also be provided. Also, an information processing device (for example, a processing circuit or chip) equipped with memory storing such a computer program (for example, ROM and RAM) and one or more processors capable of executing such a computer program (such as a CPU or DSP, for example) may also be provided.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A communication control device including:

an acquisition unit that acquires carrier information indicating, from among a plurality of component carriers used for carrier aggregation, a component carrier for transmitting a discovery signal that enables another device to discover a device conducting device-to-device communication; and
a control unit that controls transmission of the carrier information to a terminal device.

(2)
The communication control device according to (1), wherein
the plurality of component carriers include one or more downlink component carriers and one or more uplink component carriers, and
the component carrier for transmitting the discovery signal is one of the one or more uplink component carriers.

(3)
The communication control device according to (1) or (2), wherein
the control unit controls transmission of system information that includes the carrier information.

(4)
The communication control device according to (3), wherein
the control unit controls transmission of the system information in a manner that the system information is transmitted on each component carrier that carries a downlink signal from among the plurality of component carriers.

(5)
The communication control device according to (1) or (2), wherein
the control unit controls transmission of the carrier information by signaling to an individual terminal device.

(6)
The communication control device according to (5), wherein
the carrier information transmitted by signaling to the individual terminal device indicates a component carrier used to transmit the discovery signal by a terminal device positioned nearby the individual terminal device.

(7)
The communication control device according to any one of (1) to (6), wherein
the component carrier for transmitting the discovery signal is a component carrier indicated by individual carrier information transmitted by an individual terminal device, and is the component carrier used to transmit the discovery signal by the individual terminal device.

(8)
The communication control device according to any one of (1) to (6), wherein
the component carrier for transmitting the discovery signal is a component carrier designated by a base station.

(9)
A communication control method including:
acquiring carrier information indicating, from among a plurality of component carriers used for carrier aggregation, a component carrier for transmitting a discovery signal that enables another device to discover a device conducting device-to-device communication; and
controlling, with a processor, transmission of the carrier information to a terminal device.

(10)
A terminal device including:
an acquisition unit that acquires carrier information indicating, from among a plurality of component carriers used for carrier aggregation, a component carrier for transmitting a discovery signal that enables another device to discover a device conducting device-to-device communication; and
a control unit that controls a detection process for detecting the discovery signal on the basis of the carrier information.

(11)
The terminal device according to (10), wherein
the control unit, after detecting the discovery signal transmitted by another terminal device, controls transmission of the discovery signal in a manner that the discovery signal is relayed on a component carrier that does not carry the discovery signal transmitted by the other terminal device from among the plurality of component carriers.

(12)
The terminal device according to (11), wherein
in a case in which the discovery signal transmitted by the other terminal device is the discovery signal relayed by the other terminal device, the control unit controls transmission of the discovery signal so that the discovery signal is not relayed further.

(13)
A terminal device including:
an acquisition unit that acquires individual carrier information indicating, from among a plurality of component carriers used for carrier aggregation, a component carrier used by the terminal device to transmit a discovery signal that enables another device to discover a device conducting device-to-device communication; and a control unit that controls transmission of the individual carrier information to a base station.

(14)
A terminal device including:
an acquisition unit that acquires carrier information indicating, from among a plurality of component carriers used for carrier aggregation, a component carrier for transmitting a discovery signal that enables another device to discover a device conducting device-to-device communication; and
a control unit that controls transmission of the discovery signal on the basis of the carrier information.

(15)
A terminal device including:
an acquisition unit that acquires information related to each of a plurality of component carriers used for carrier aggregation; and
a control unit that controls transmission of a discovery signal that enables another device to discover a device conducting device-to-device communication in a manner that the discovery signal is transmitted on each of the plurality of component carriers.

(16)
The terminal device according to (15), wherein
each of the plurality of component carriers is an uplink component carrier.

(17)
A terminal device including:
an acquisition unit that acquires information related to one component carrier from among a plurality of component carriers used for carrier aggregation; and
a control unit that controls a detection process for detecting a discovery signal that enables another device to discover a device conducting device-to-device communication in a manner that the detection process is conducted on a signal transmitted on the one component carrier,
wherein the discovery signal is a signal transmitted on each of the plurality of component carriers.

(18)
The terminal device according to (17), wherein
the one component carrier is a primary component carrier for the terminal device.
(19)
The terminal device according to (17) or (18), wherein
the one component carrier is an uplink component carrier.
(20)
A communication control device including:
an acquisition unit that acquires carrier information indicating a component carrier for transmitting a signal related to device-to-device communication from among multiple component carriers used for carrier aggregation; and
a control unit that controls transmission of the carrier information to a terminal device.
(21)
The communication control device according to (20), wherein
the signal related to device-to-device communication includes a device-to-device communication signal, or a signal for starting device-to-device communication.
(22)
The communication control device according to (21), wherein
the device-to-device communication signal includes a data signal or a control signal.
(23)
The communication control device according to (21) or (22), wherein
the signal for starting device-to-device communication includes a synchronization signal, a discovery signal, or a control signal for connection establishment.
(24)
A terminal device including:
an acquisition unit that acquires carrier information indicating a component carrier for transmitting a signal related to device-to-device communication from among multiple component carriers used for carrier aggregation; and
a control unit that controls transmission of the signal related to device-to-device communication on the basis of the carrier information.
(25)
A communication control device including:
an acquisition unit that acquires resource information that indicates a radio resource usable for device-to-device communication from among radio resources in an uplink band of frequency-division duplex (FDD) paired bands; and
a control unit that controls transmission of the resource information in a downlink band of the paired bands.
(26)
The communication control device according to (25), wherein
the radio resource is a radio resource of a specific radio frame or a specific subframe, and
the resource information indicates the specific radio frame or the specific subframe.
(27)
The communication control device according to (25) or (26), wherein
the radio resource is a radio resource in a specific band of the uplink band, and
the resource information indicates the specific band.
(28)
The communication control device according to any one of (25) to (27), wherein
the radio resource is a specific resource block, and
the resource information indicates the specific resource block.
(29)
The communication control device according to any one of (25) to (28), wherein
the control unit controls transmission of system information that includes the resource information on the downlink band.
(30)
The communication control device according to any one of (25) to (28), wherein
the control unit controls transmission of the system information by signaling to an individual terminal device on the downlink band.
(31)
A terminal device including:
an acquisition unit that acquires resource information that indicates radio resources usable for device-to-device communication from among radio resources in an uplink band of FDD paired bands; and
a control unit that controls device-to-device communication by the terminal device on the uplink band on the basis of the resource information.
(32)
A communication control device comprising:
circuitry configured to
acquire system information indicating information to enable a device to communicate with another device via device-to-device communication; and
control transmission of the system information to a terminal device.
(33)
The communication control device according to (32), wherein the system information includes information of a carrier for transmitting a discovery signal, the carrier being from a plurality of carriers,
the plurality of carriers include one or more downlink carriers and one or more uplink carriers, and
the carrier for transmitting the discovery signal is one of the one or more uplink carriers.
(34)
The communication control device according to any one of (32) to (33), wherein
the circuitry controls transmission of system information that includes component carrier information from a plurality of component carriers.
(35)
The communication control device according to (34), wherein
the circuitry causes transmission of the system information on each component carrier that carries a downlink signal from among the plurality of component carriers.
(36)
The communication control device according to any one of (32) to (35), wherein
the circuitry controls transmission of the system information by signaling to an individual terminal device.
(37)
The communication control device according to (36), wherein
the system information transmitted by signaling to the individual terminal device indicates a component carrier used to transmit a discovery signal by a terminal device within communication range of the individual terminal device.

(38)

The communication control device according to any one of (32) to (37), wherein
a component carrier for transmitting a discovery signal is transmitted by an individual terminal device, and is the component carrier used to transmit the discovery signal by the individual terminal device.

(39)

The communication control device according to any one of (33) to (38), wherein
the component carrier for transmitting the discovery signal is a component carrier designated by a base station.

(40)

A communication control method comprising:
acquiring system information indicating information to enable a device to communicated with another device via device-to-device communication; and controlling, with a processor, transmission of the system information to a terminal device.

(41)

A terminal device comprising:
circuitry configured to
acquire system information indicating information to enable a device to communicate with another device via device-to-device communication; and
control a detection process for detecting a discovery signal on the basis of the system information.

(42)

The terminal device according to (41), wherein
the circuitry, after detecting the discovery signal transmitted by another terminal device, controls transmission of the discovery signal in a manner that the discovery signal is relayed on a component carrier that does not carry the discovery signal transmitted by the other terminal device from among a plurality of component carriers.

(43)

The communication control device according to any one of (32) to (39), wherein the system information includes radio resource information to be used by the device when communication with the other device.

(44)

A method for a terminal device, comprising:
acquiring, with circuitry, individual information to enable the terminal device to communicate with another device via device-to-device communication; and
controlling, with the circuitry, transmission of the individual information to a base station.

(45)

A terminal device comprising:
circuitry configured to
acquire information indicating information to enable a device to communicate with another device via device-to-device communication; and
control transmission of a discovery signal on the basis of the information.

(46)

The terminal device according to (45), wherein the discovery signal is transmitted on a component carrier of a plurality of component carriers for carrier aggregation.

(47)

The terminal device according to any one of (45) to (46), wherein the information includes information regarding the plurality of component carriers used for carrier aggregation, and
each of the plurality of component carriers is an uplink component carrier.

(48)

The terminal device according to any one of (45) to (47), wherein the discovery signal is transmitted on each of the plurality of component carriers.

(49)

The terminal device according to (48), wherein the information includes an indication of a component carrier that is a primary component carrier for the terminal device.

(50)

The terminal device according to any one of (48) to (49), wherein the information includes an indication of a component carrier that is an uplink component carrier.

(51)

The communication control device according to (43), wherein the device communicates with the other device via paired bands of an frequency division duplex (FDD) system, and the radio resource corresponds to an uplink band of the paired bands.

REFERENCE SIGNS LIST 1 communication system
10 cell
100 base station
151 information acquisition unit
153 communication control unit
200 terminal device
261, 271, 281 information acquisition unit
263, 273, 283 communication control unit

The invention claimed is:

1. An electronic device comprising:
circuitry configured to
control performing wireless communication via a plurality of component carriers including uplink component carriers and downlink component carriers aggregated by carrier aggregation;
receive carrier information via a first component carrier of the plurality of component carriers, the carrier information indicating a second component carrier of the plurality of component carriers, wherein the second component carrier is used for transmitting a discovery signal for device-to-device communication, and the first component carrier is a downlink component carrier and the second component carrier is an uplink component carrier; and
monitor the discovery signal both in an RRC_IDLE mode and an RRC_CONNECTED mode based on the carrier information, the RRC_IDLE mode being without a Radio Resource Control (RRC) connection and the RRC_CONNECTED mode being with the RRC connection.

2. The electronic device of claim 1, wherein the circuitry is further configured to monitor the discovery signal in the second component carrier indicated by the carrier information.

3. The electronic device of claim 2, wherein the circuitry is further configured to monitor the discovery signal in one or more component carriers including the second component carrier indicated by the carrier information.

4. The electronic device of claim 1, wherein the carrier information is received as system information via the first component carrier.

5. The electronic device of claim 1, wherein the second component carrier corresponds to a primary component carrier of the carrier aggregation, the primary component carrier being used to establish the RRC connection.

6. The electronic device of claim 1, wherein the first component carrier corresponds to a primary component carrier of the carrier aggregation, the primary component carrier being used to establish the RRC connection.

7. The electronic device of claim 1, wherein the carrier information further indicates one or more component carriers via which the discovery signal is transmitted.

8. The electronic device of claim 1, wherein the circuitry is further configured to receive the discovery signal and perform device-to-device communication using the second component carrier.

9. The electronic device of claim 8, wherein the circuitry is further configured to relay the discovery signal to another electronic device.

10. The electronic device of claim 9, wherein the relay procedure is performed based on component carrier information of the another electronic device.

11. The electronic device of claim 10, wherein the component carrier information indicates a capability of one or more component carriers.

12. A method performed by an electronic device, the method comprising:
controlling performing wireless communication via a plurality of component carriers including uplink component carriers and downlink component carriers aggregated by carrier aggregation;
receiving carrier information via a first component carrier of the plurality of component carriers, the carrier information indicating a second component carrier of the plurality of component carriers, wherein the second component carrier is used for transmitting a discovery signal for device-to-device communication, and the first component carrier is a downlink component carrier and the second component carrier is an uplink component carrier; and
monitoring the discovery signal both in RRC_IDLE mode and RRC_CONNECTED mode based on the carrier information, the RRC_IDLE mode being without a Radio Resource Control (RRC) connection and the RRC_CONNECTED mode being with the RRC connection.

13. A communication control device comprising:
circuitry configured to:
control performing wireless communication via a plurality of component carriers including uplink component carriers and downlink component carriers aggregated by carrier aggregation; and
transmit carrier information to a terminal device via a first component carrier of the plurality of component carriers, the carrier information indicating a second component carrier of the plurality of component carriers, wherein the second component carrier is used for transmitting a discovery signal for device-to-device communication, and the first component carrier is a downlink component carrier and the second component carrier is an uplink component carrier, wherein
the discovery signal is monitored by the terminal device both in RRC_IDLE mode and RRC_CONNECTED mode based on the carrier information, the RRC_IDLE mode being without a Radio Resource Control (RRC) connection and the RRC_CONNECTED mode being with the RRC connection.

14. A method performed by a communication control device, the method comprising:
controlling performing wireless communication via a plurality of component carriers including uplink component carriers and downlink component carriers aggregated by carrier aggregation; and
transmitting carrier information to a terminal device via a first component carrier of the plurality of component carriers, the carrier information indicating a second component carrier of the plurality of component carriers, wherein the second component carrier is used for transmitting a discovery signal for device-to-device communication, and the first component carrier is a downlink component carrier and the second component carrier is an uplink component carrier, wherein
the discovery signal is monitored by the terminal device both in RRC_IDLE mode and RRC_CONNECTED mode based on the carrier information, the RRC_IDLE mode being without a Radio Resource Control (RRC) connection and the RRC_CONNECTED mode being with the RRC connection.

* * * * *